June 24, 1924.

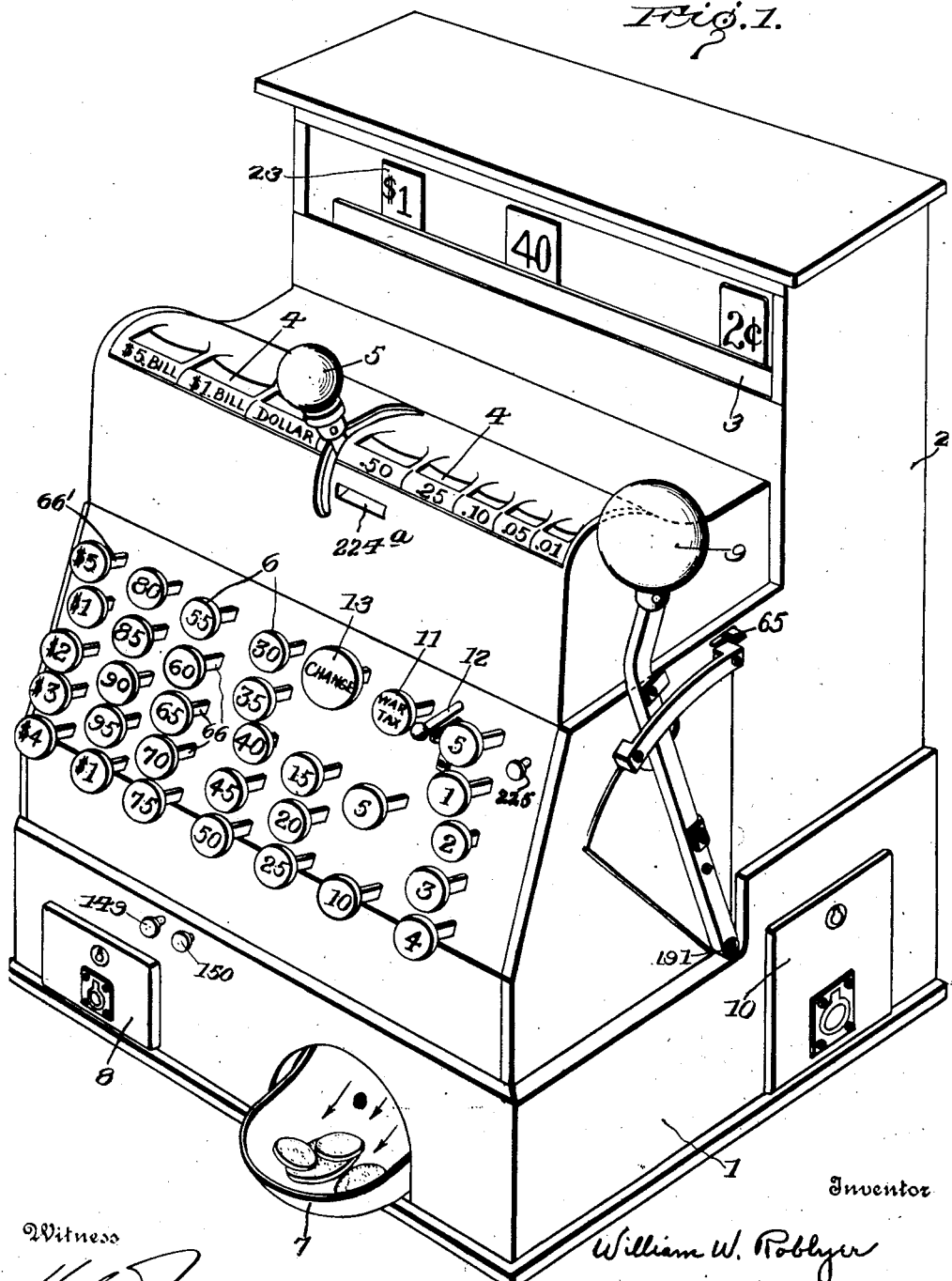

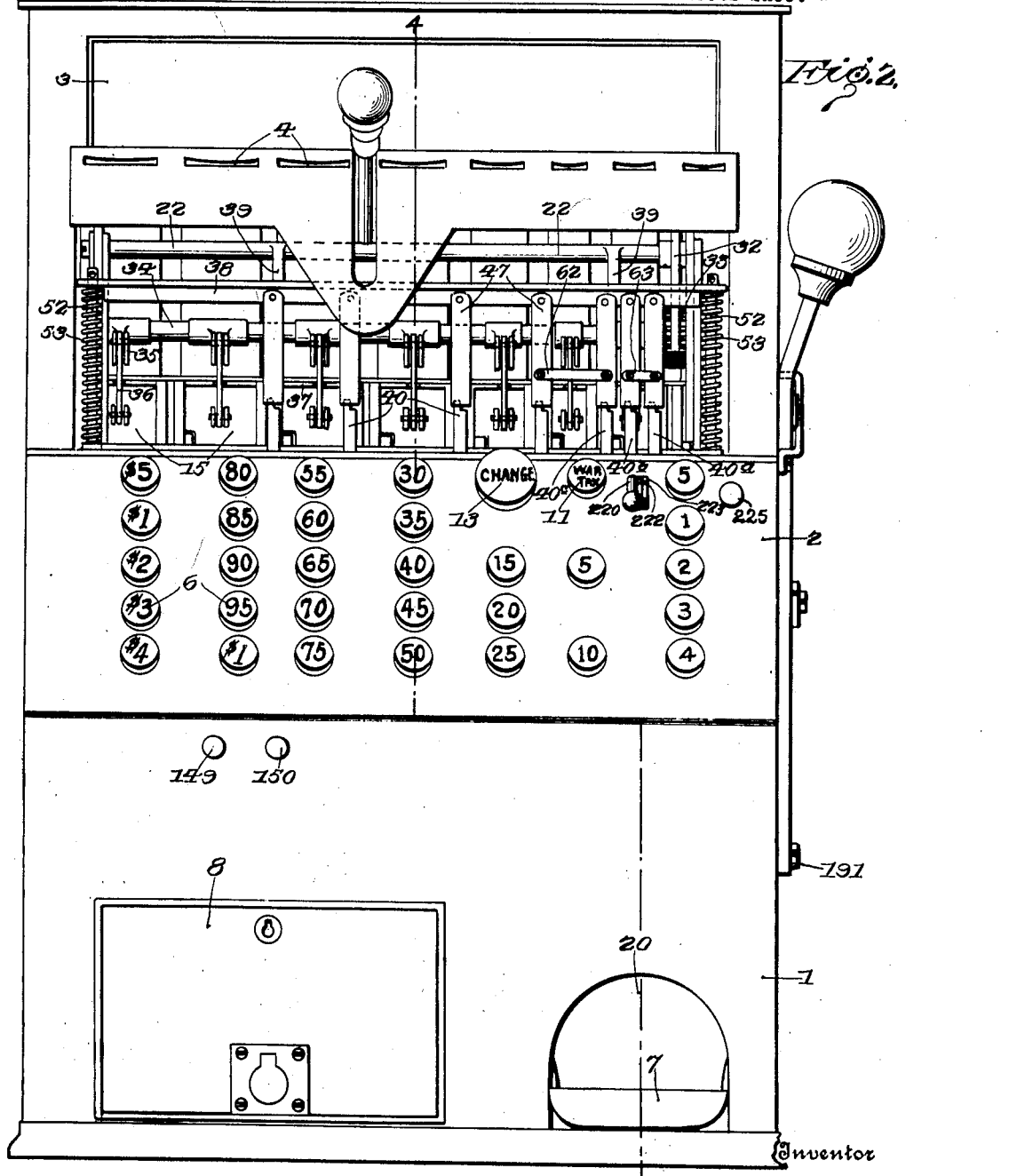

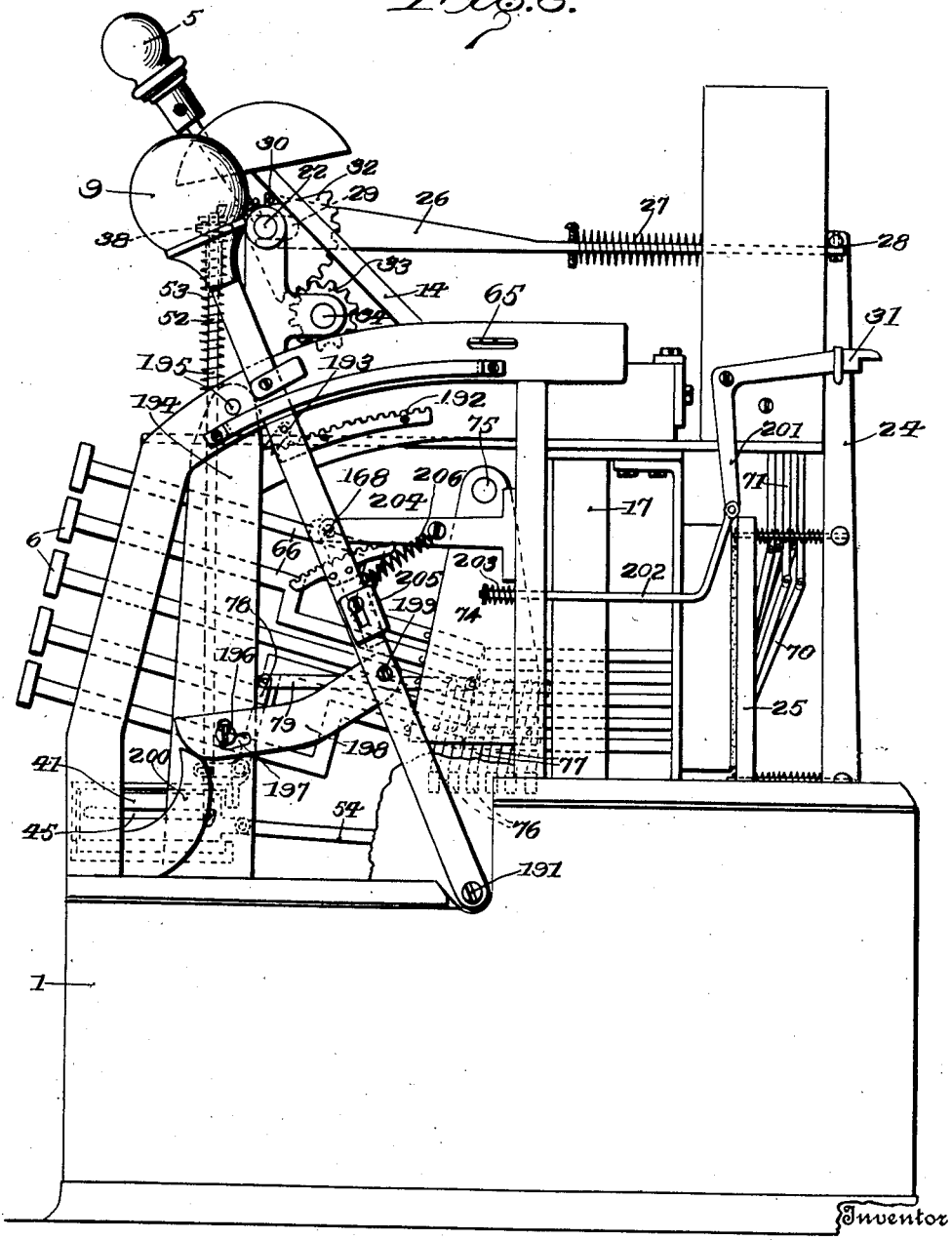

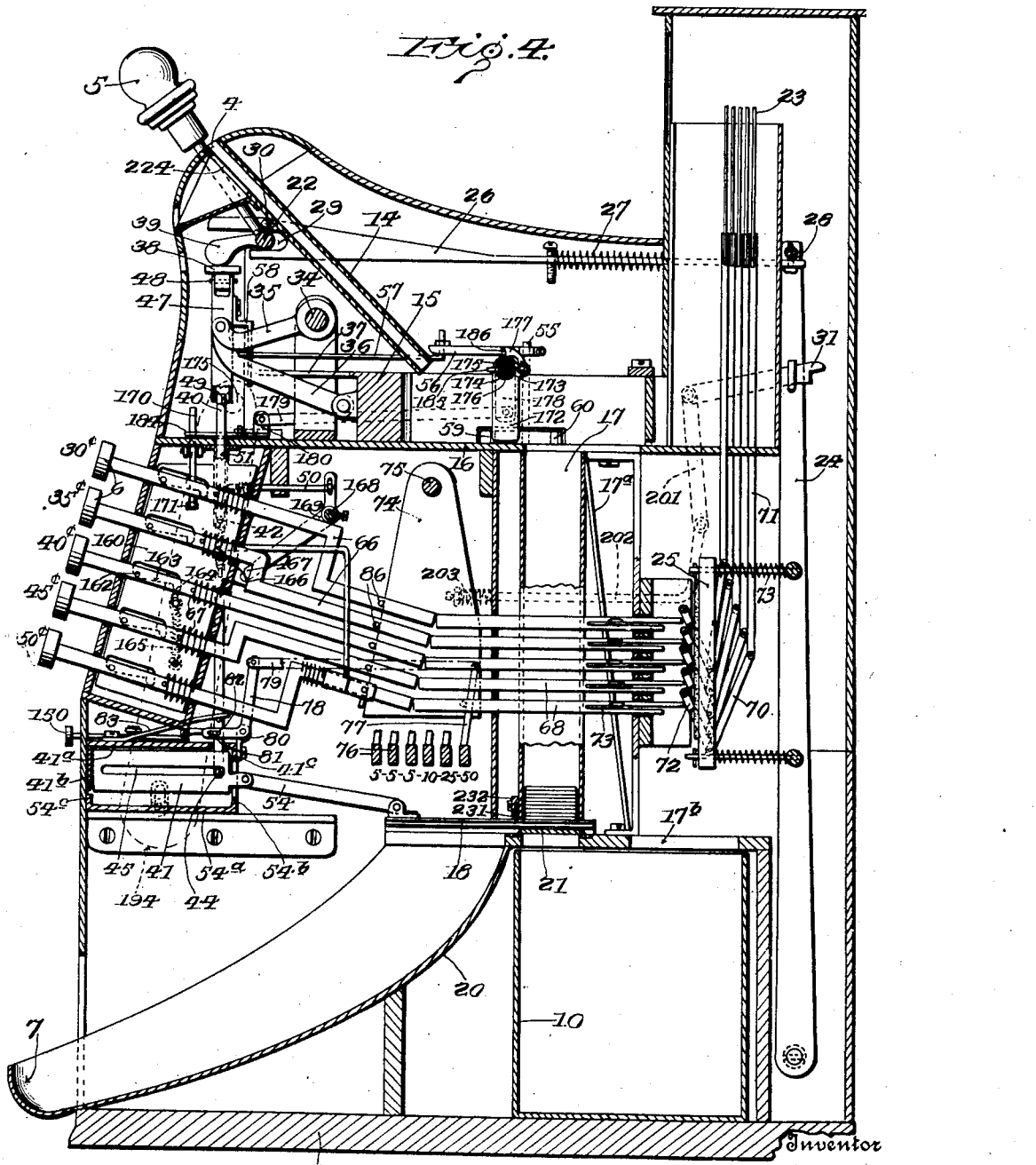

W. W. ROBLYER

AUTOMATIC CHANGE MAKER

Filed Dec. 30, 1919     18 Sheets-Sheet 5

1,499,253

Inventor
William W. Roblyer
By Sturtevant & Mason
Attorneys

Witness

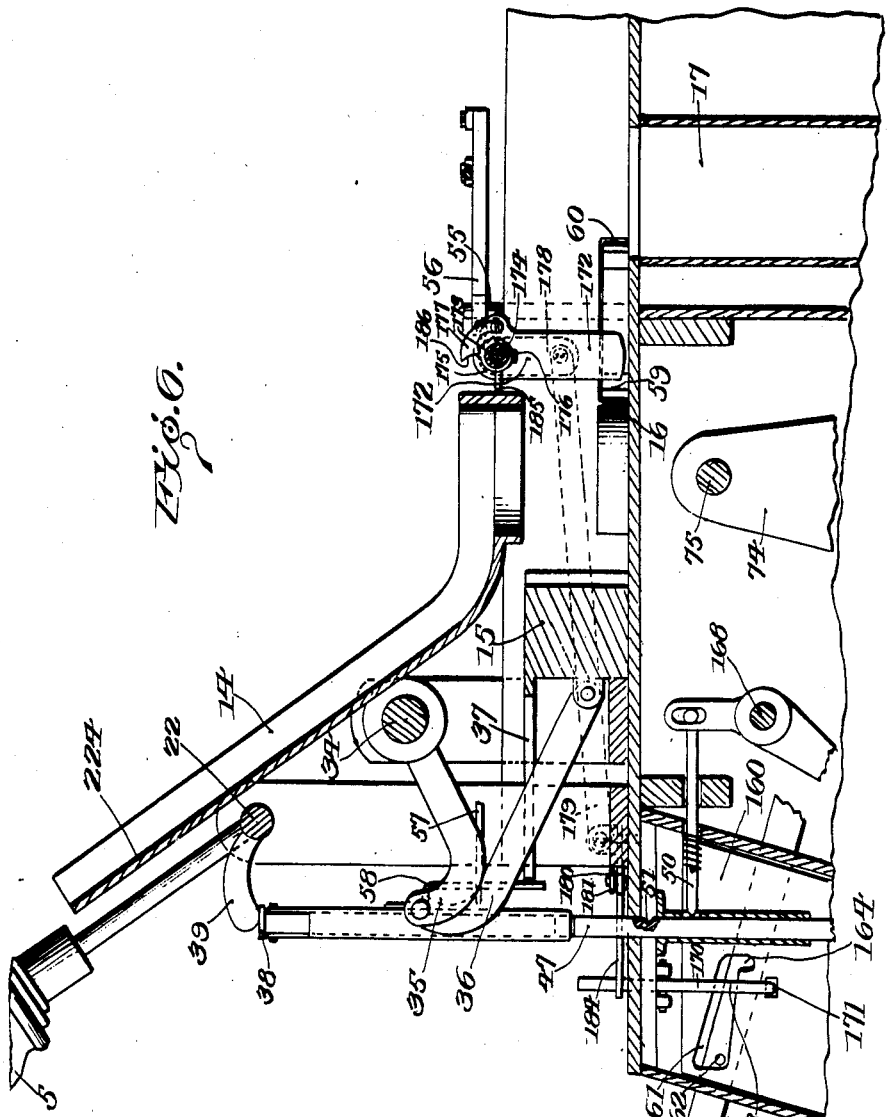

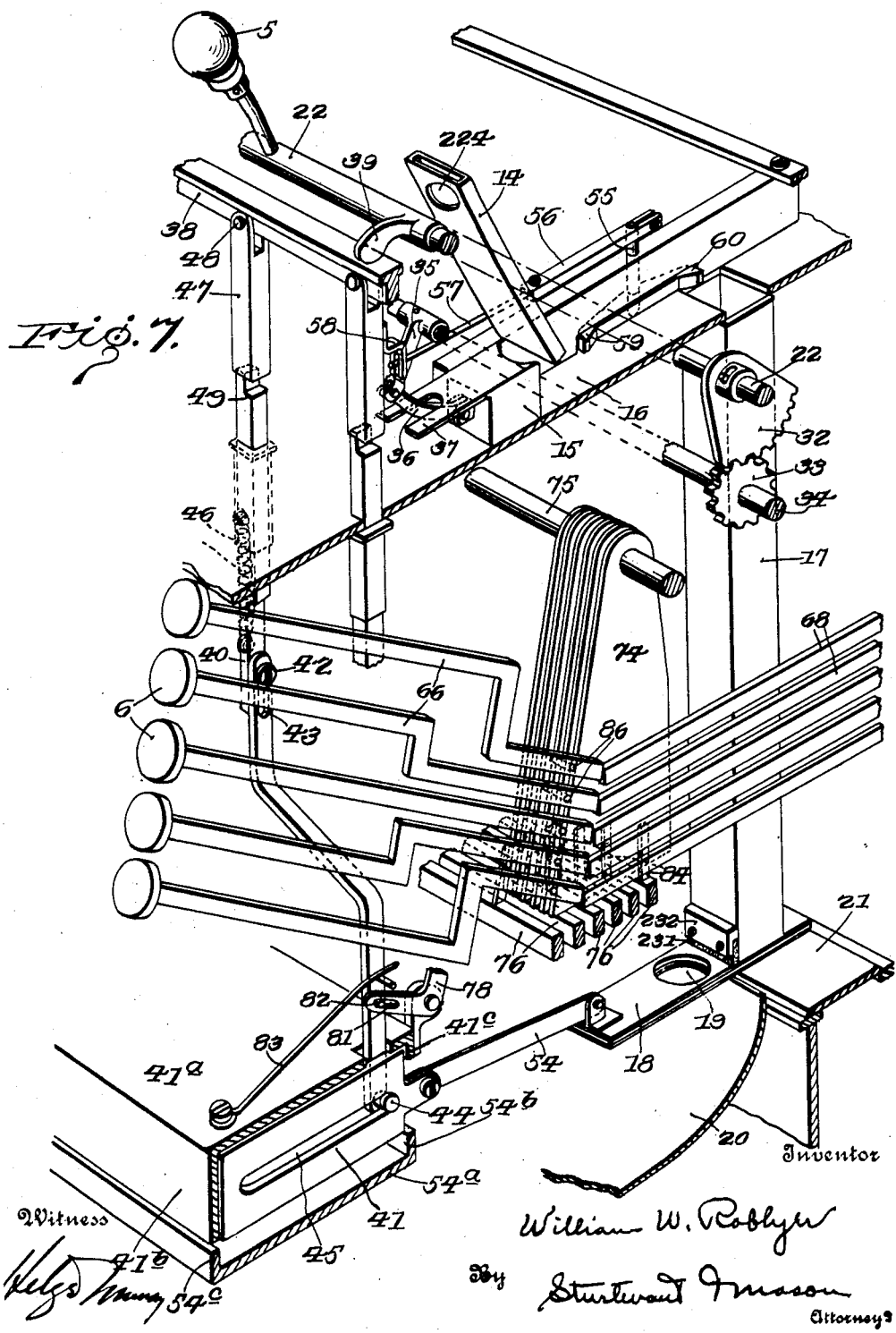

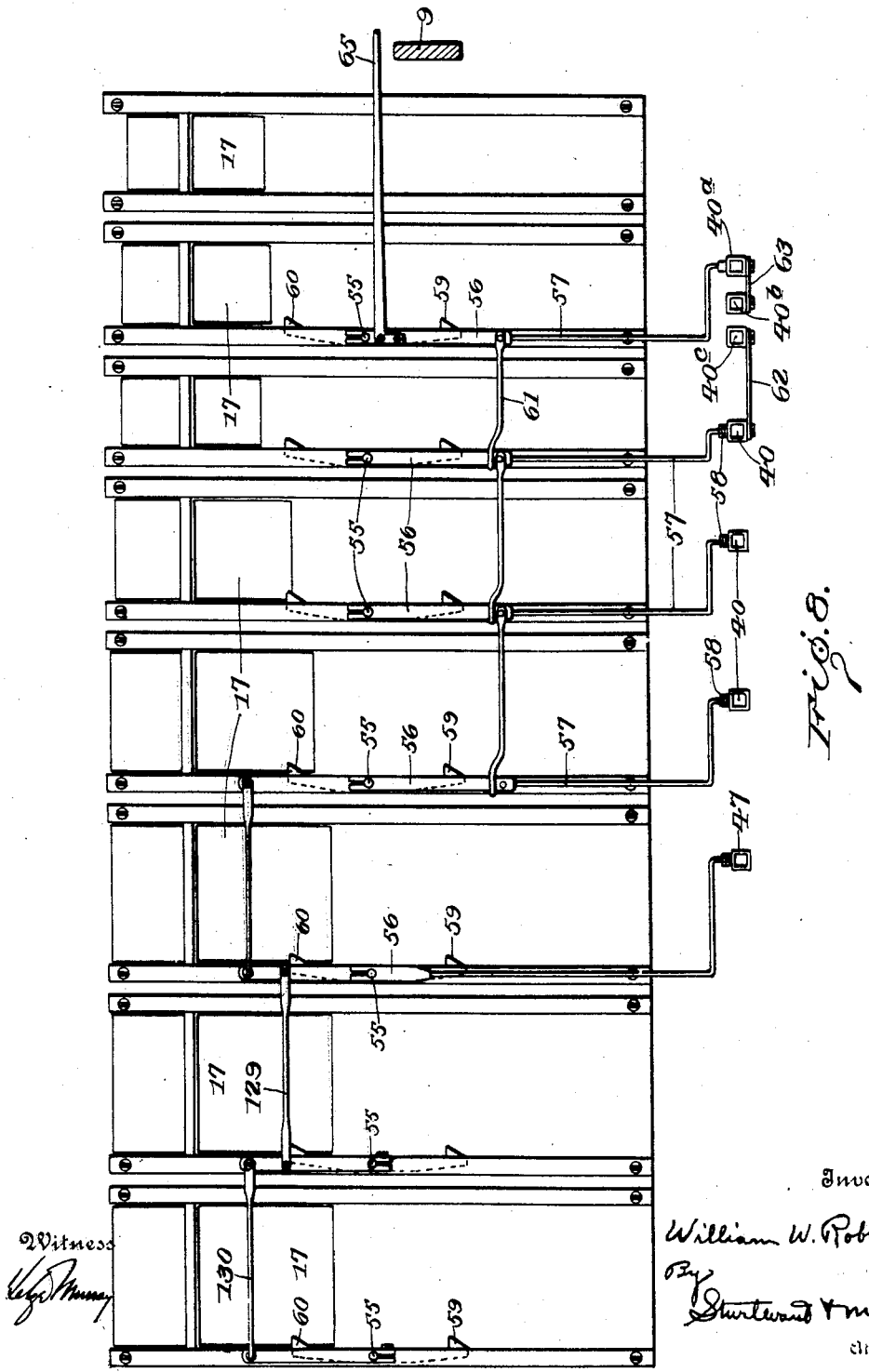

June 24, 1924.
W. W. ROBLYER
AUTOMATIC CHANGE MAKER
Filed Dec. 30, 1919   18 Sheets-Sheet 9
1,499,253
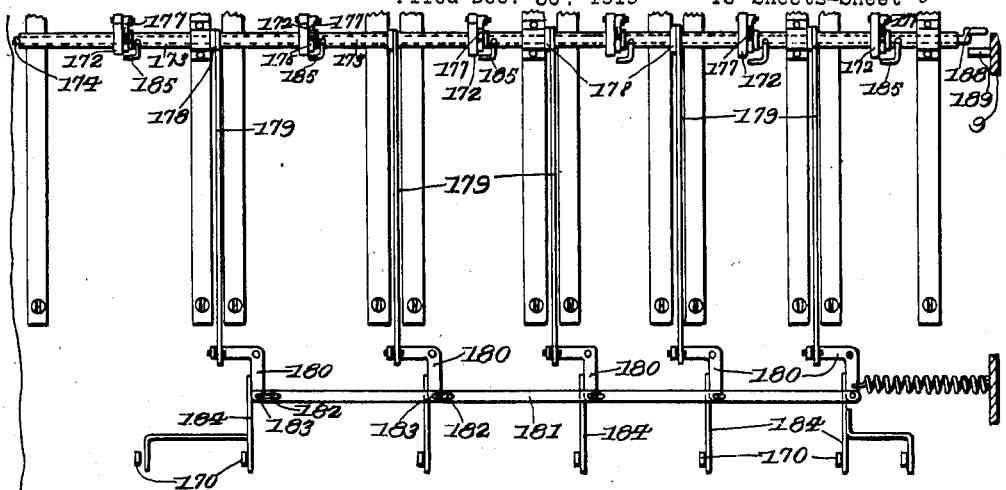
Fig. 9.
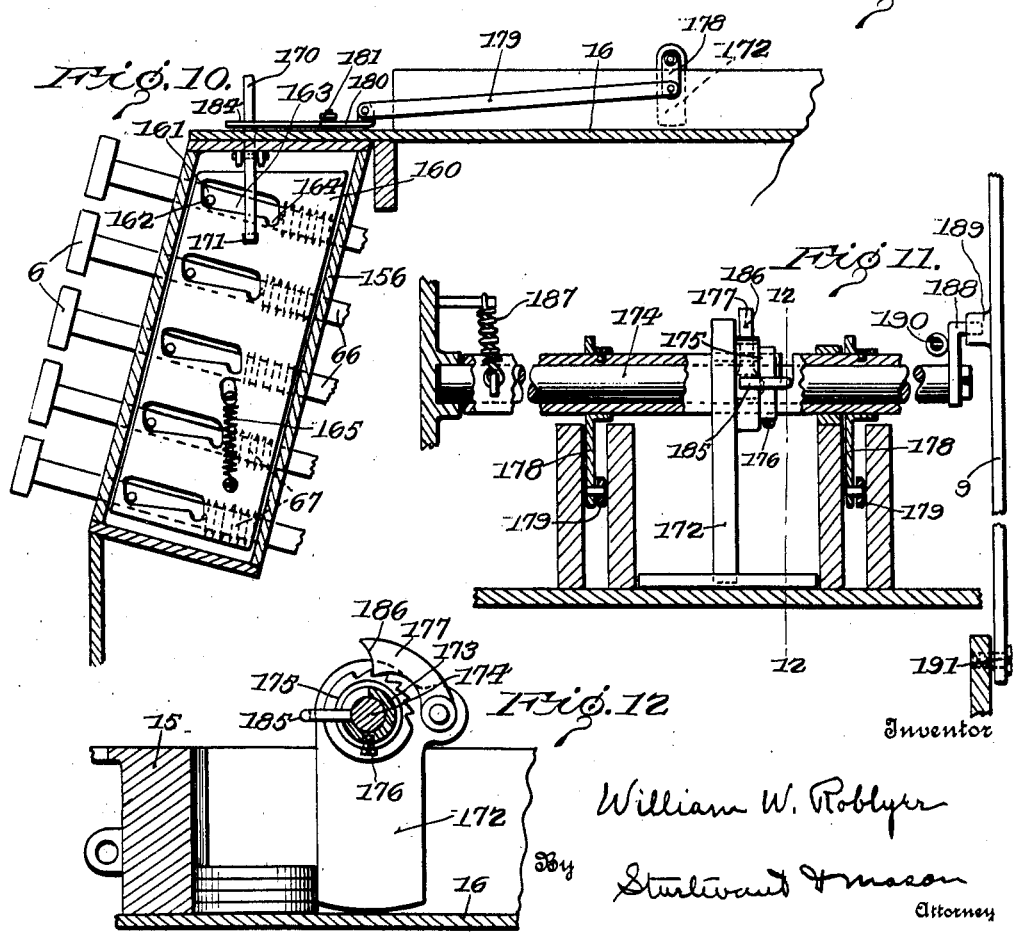
Inventor
William W. Roblyer
By Sturtevant & Mason
Attorney

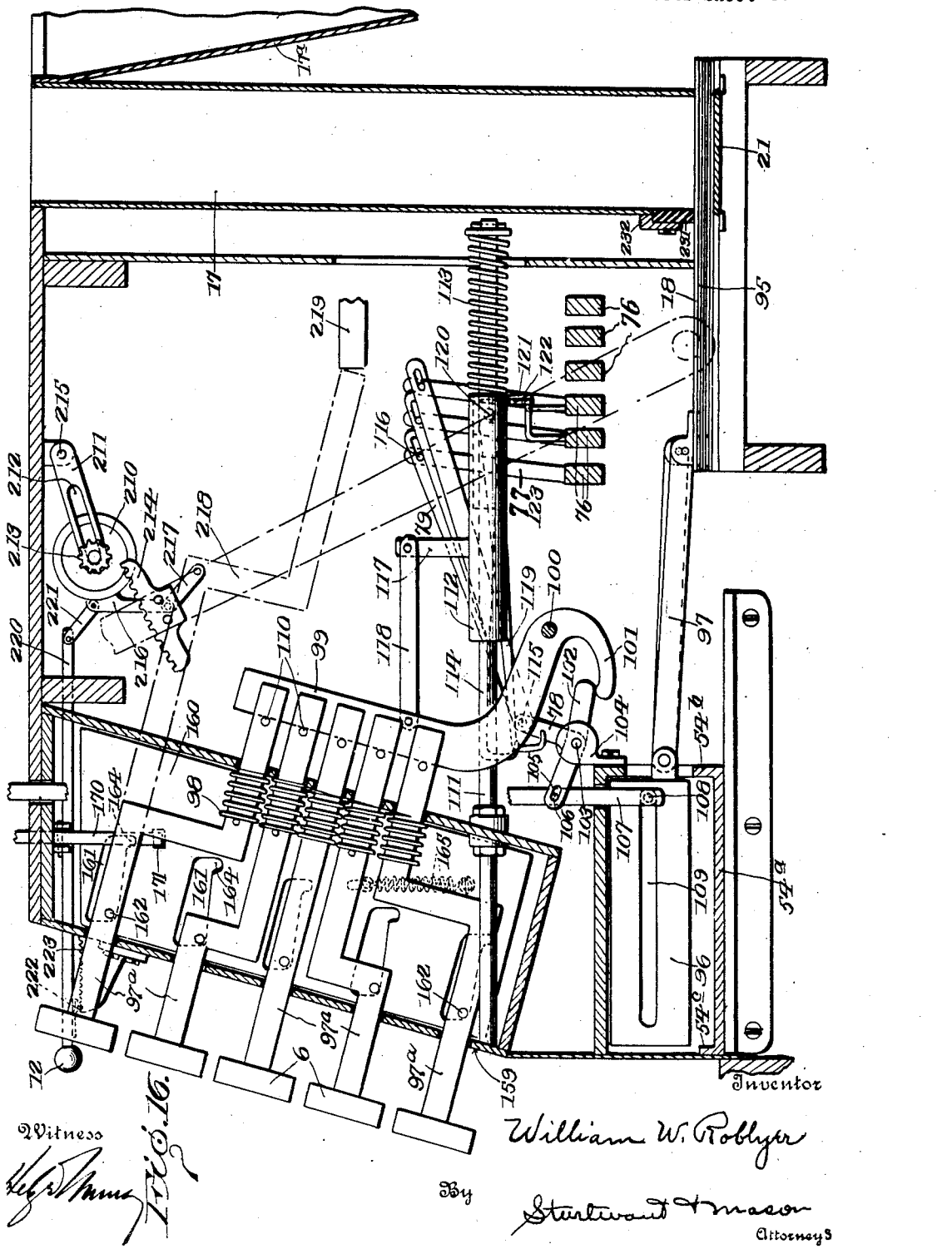

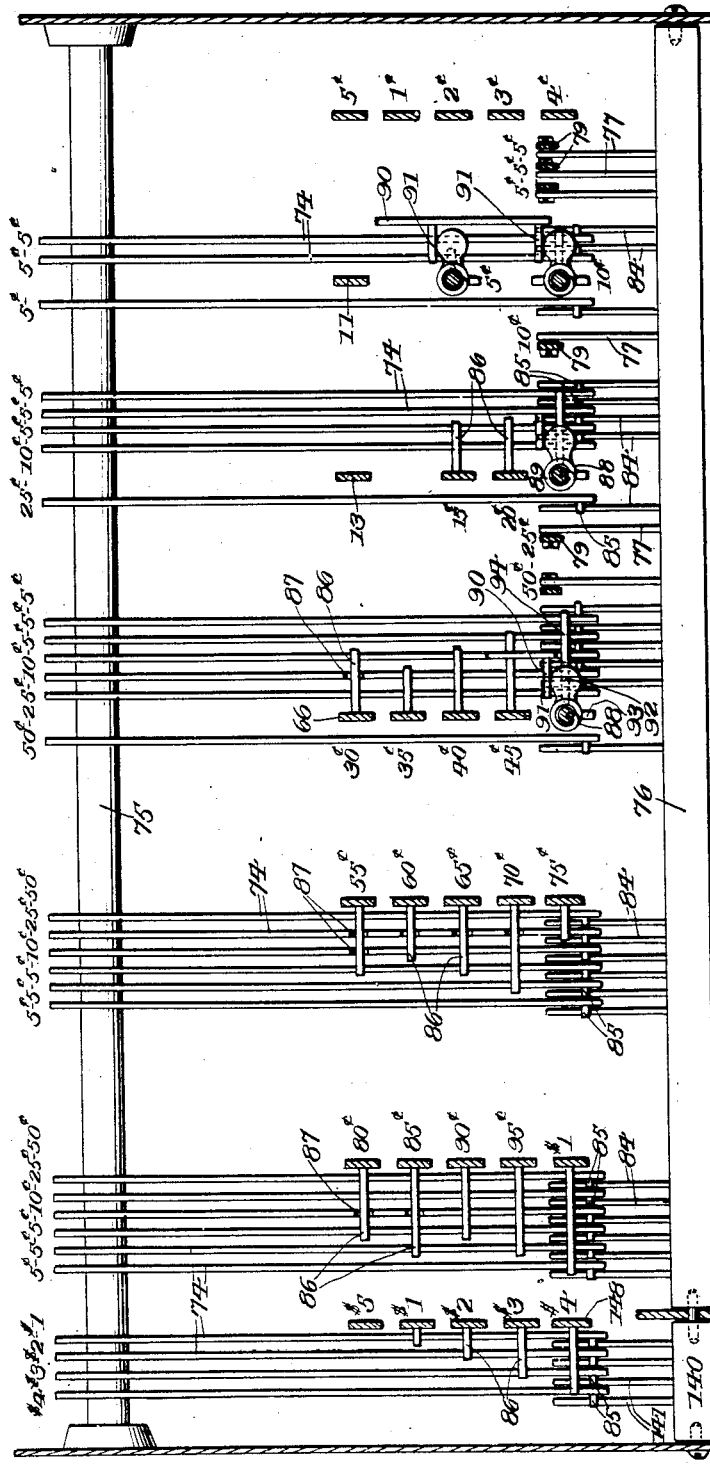

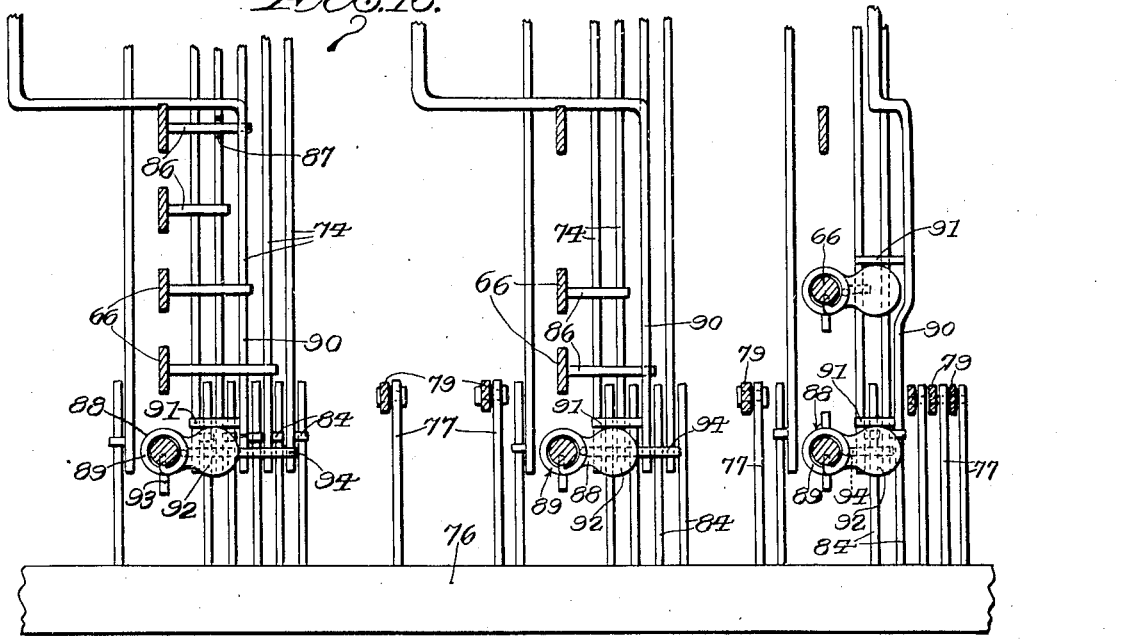
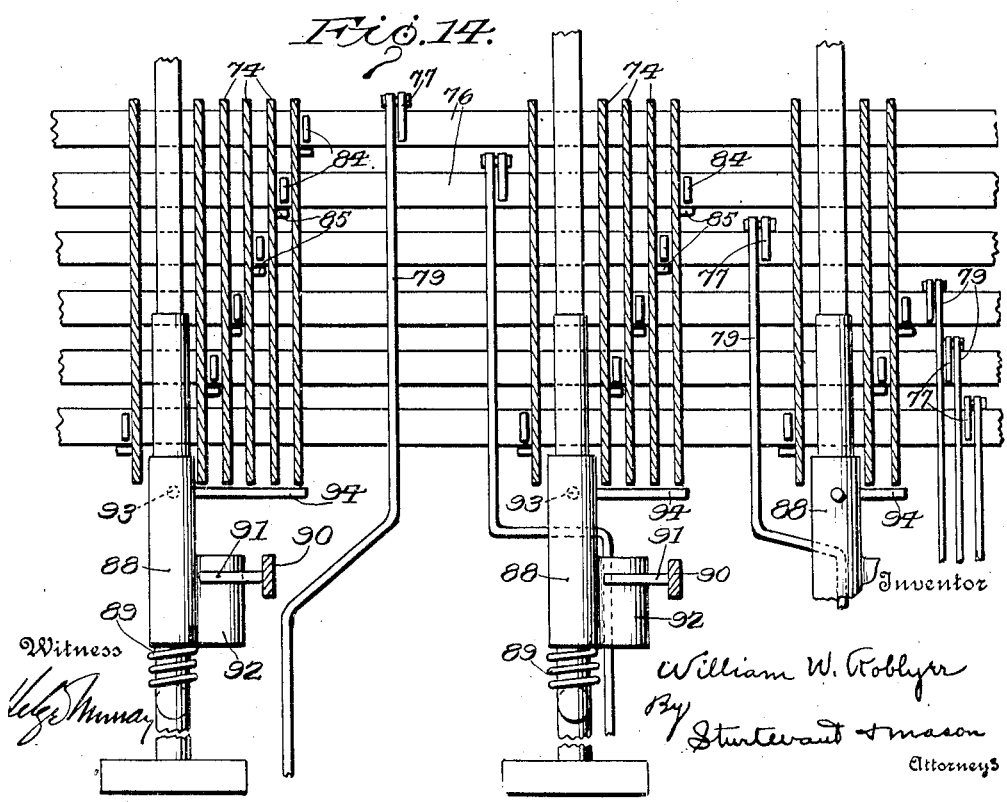

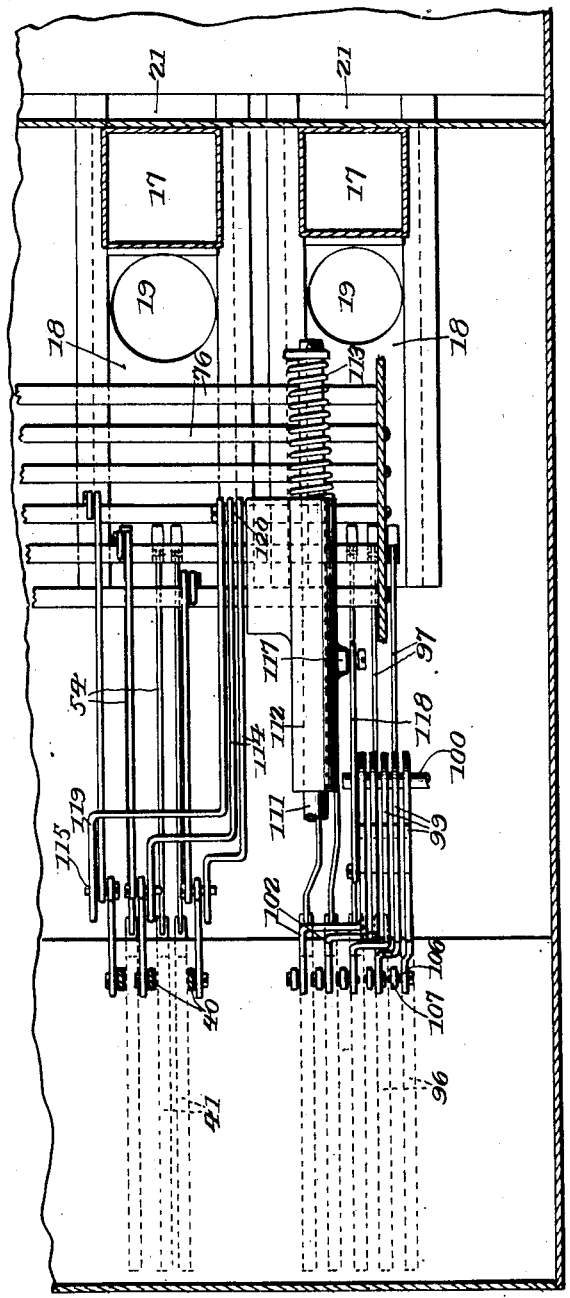

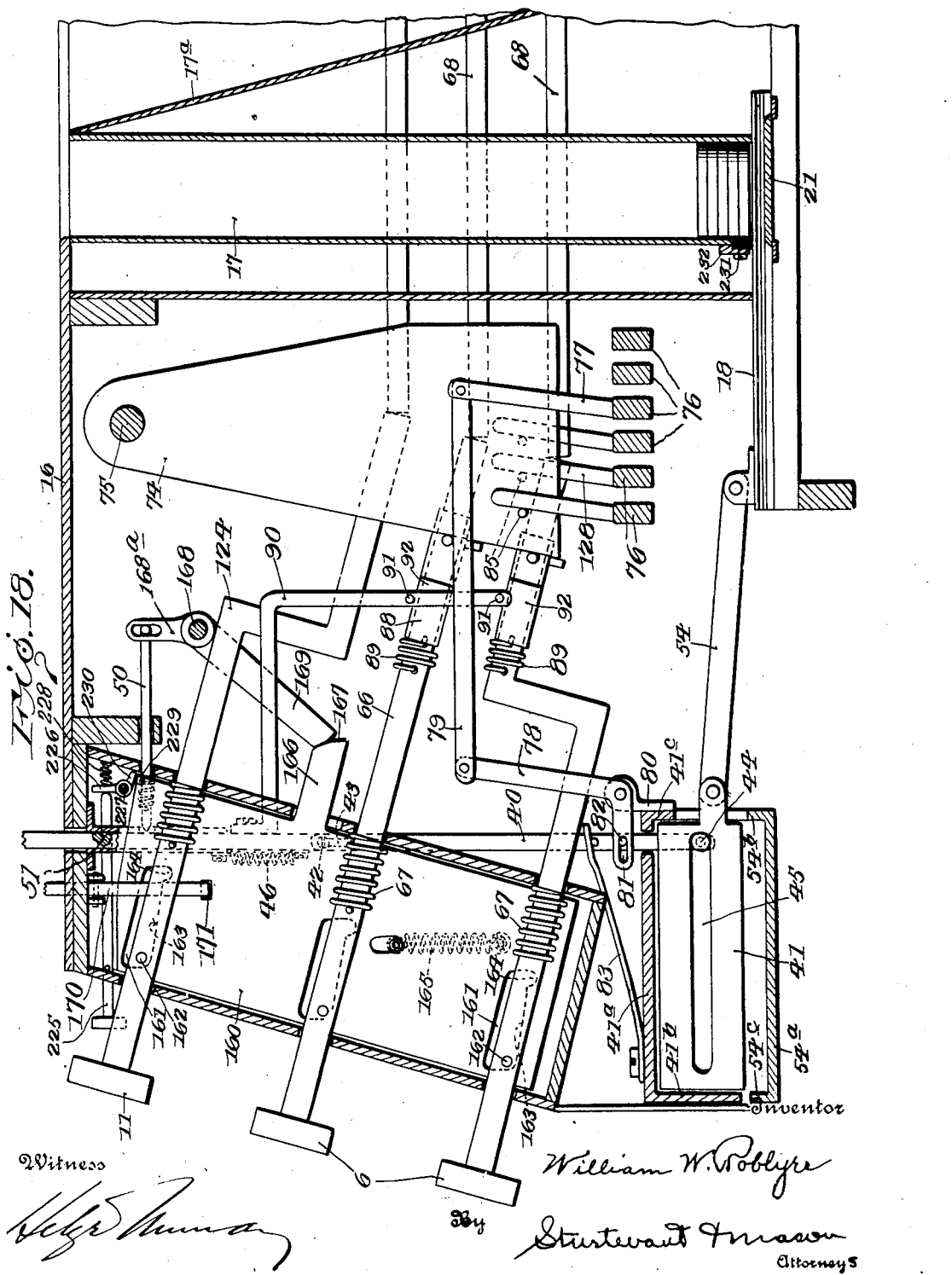

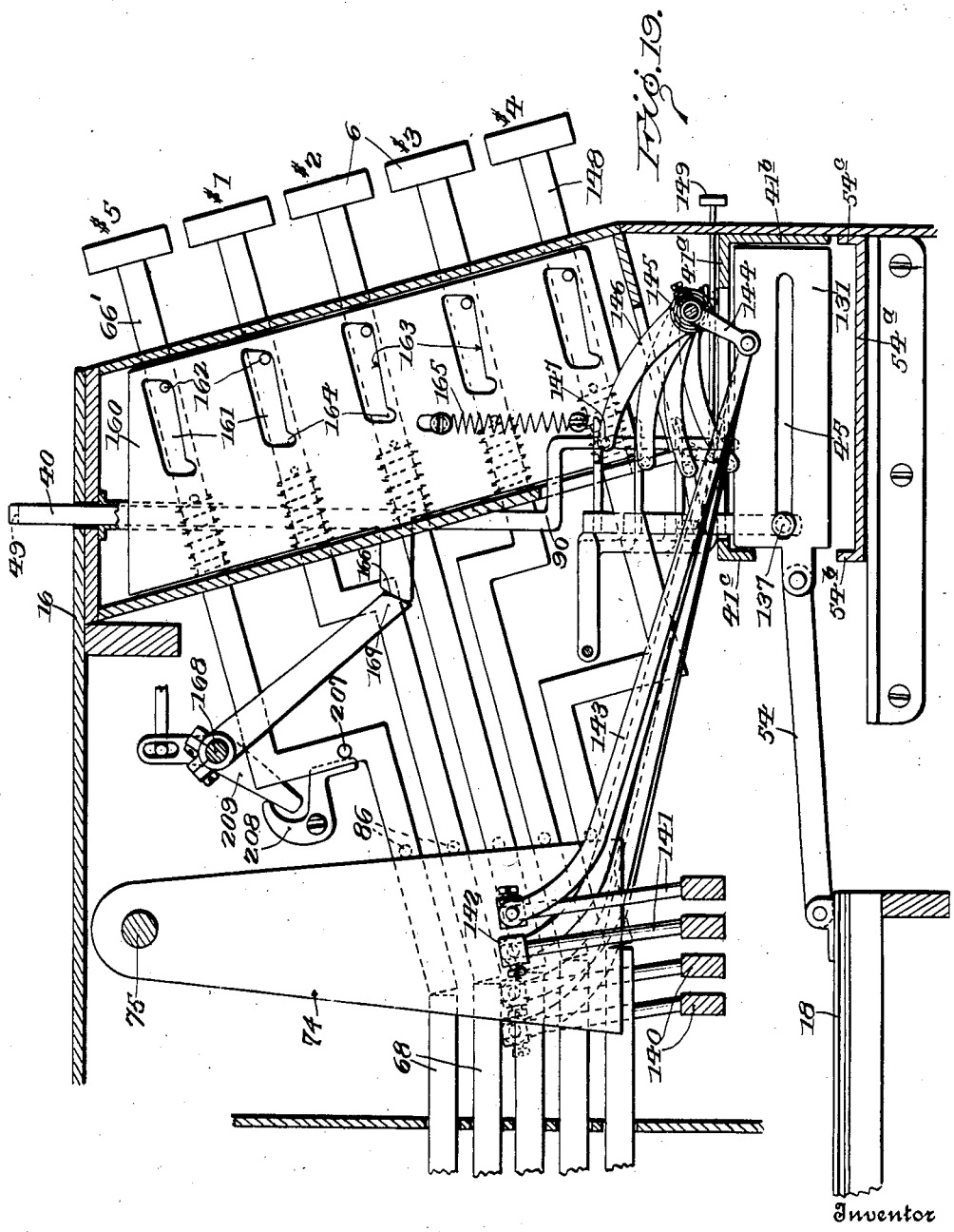

June 24, 1924.

W. W. ROBLYER 1,499,253

AUTOMATIC CHANGE MAKER

Filed Dec. 30, 1919    18 Sheets—Sheet 16

June 24, 1924.
W. W. ROBLYER
AUTOMATIC CHANGE MAKER
Filed Dec. 30, 1919
1,499,253
13 Sheets-Sheet 17
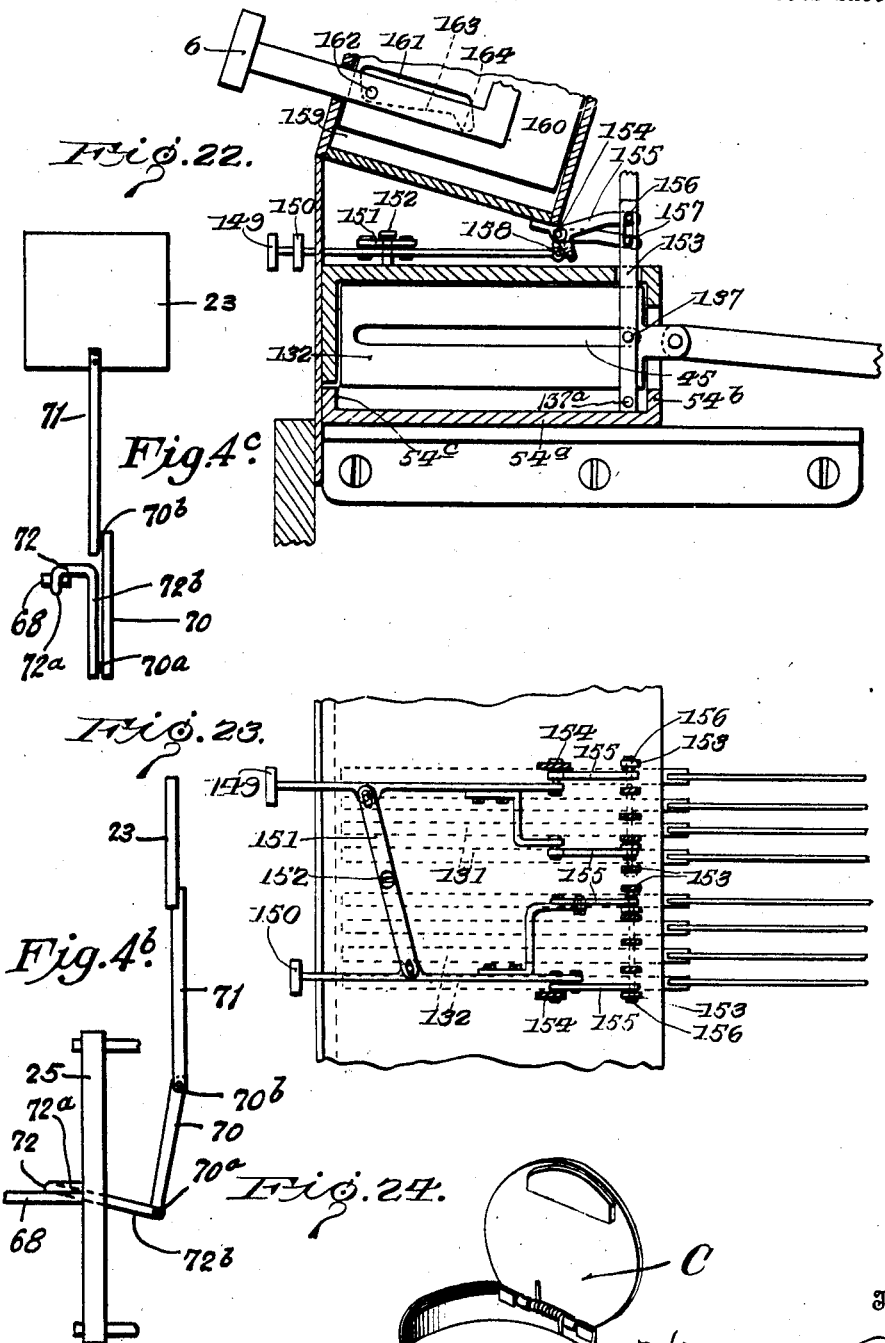

June 24, 1924.
W. W. ROBLYER
AUTOMATIC CHANGE MAKER
Filed Dec. 30, 1919
1,499,253
18 Sheets-Sheet 18
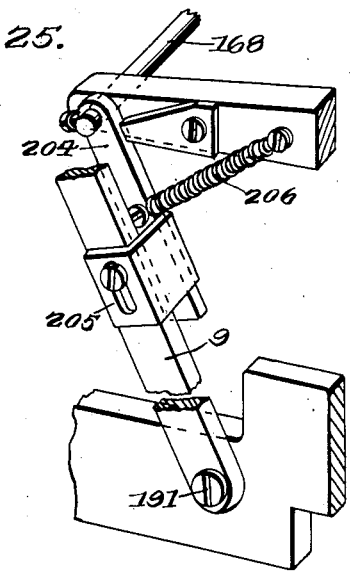
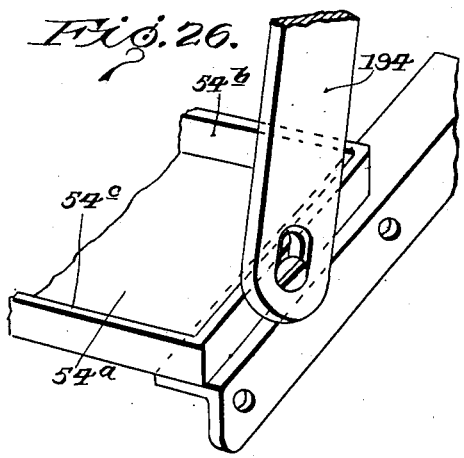
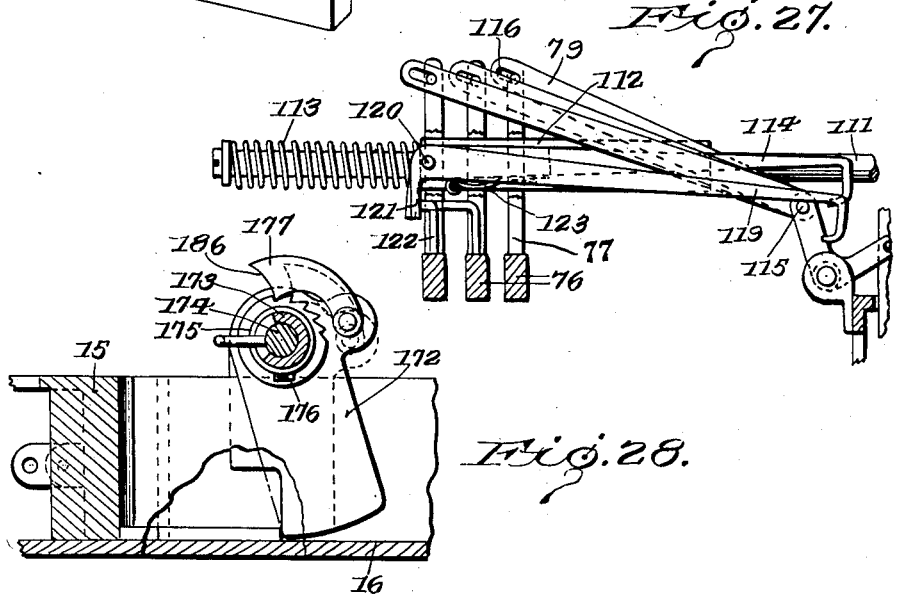
Inventor
William W. Roblyer
By Sturtevant & Mason
Attorneys
Witness Patented June 24, 1924.

1,499,253

UNITED STATES PATENT OFFICE.

WILLIAM W. ROBLYER, OF WICHITA, KANSAS, ASSIGNOR TO THE ROBLYER AUTOMATIC CHANGE MAKER COMPANY, OF WICHITA, KANSAS, A CORPORATION OF KANSAS.

AUTOMATIC CHANGE MAKER.

Application filed December 30, 1919. Serial No. 348,354.

*To all whom it may concern:*

Be it known that I, WILLIAM W. ROBLYER, a citizen of the United States, residing at Wichita, in the county of Sedgwick, State of Kansas, have invented certain new and useful Improvements in Automatic Change Makers, of which the following is a description, reference being had to the accompanying drawing and to the figures of reference marked thereon.

The invention relates to new and useful improvements in change making machines, and more particularly to machines of the type wherein the amount of change delivered is computed by the mechanism of the machine itself.

An object of the invention is to provide a machine of the above type wherein the coin received sets up for delivery a combination of coins equal in value to the coin received, and wherein the purchase key, when depressed, withdraws from the combination set up, an amount equal to the purchase price, permitting the remainder to be delivered.

Another object of the invention is to provide a machine of the above character wherein a single sliding member is used for ejecting the coins in change, and which may, therefore, be utilized for ejecting change equal in amount to the coin inserted.

Still another object of the invention is to provide a machine wherein a series of coins may be received and a purchase deducted therefrom greater in amount than the smallest coin received.

A further object of the invention is to provide a machine constructed to receive coins of different denominations, and wherein the coin of smallest denomination alone controls and sets for delivery a combination of coins equal in value to the said smallest coin, and wherein the purchase key takes from the set combination an amount in excess of the purchase price over the coin or coins of larger denominations.

A still further object of the invention is to provide a machine having separate purchase keys representing amounts in multiples of five up to one hundred and normally locked against movement, with means operated by the coin or coins received for unlocking keys only in amount equal to the value of the coin or the sum of the values of the coins received.

A still further object of the invention is to provide a change making machine which is adapted to receive receptacles of a predetermined size for bills and which is provided with means whereby either silver dollars or receptacles containing dollar bills may be delivered in change at will.

A still further object of the invention is to provide a change making machine wherein certain purchase keys are provided with devices controlled by the coins inserted for causing the purchase key to withdraw from action different controlling slides determined by the coin put in so as to insure that the change set for delivery under all conditions shall include a five cent piece.

Still another object of the invention is to provide a change making machine having a plurality of superposed ejectors for delivering coins of the same denomination, wherein certain purchase keys are provided with devices controlled by the coins inserted for lifting the slides controlling the delivery of the coins from action which are connected to the lowermost ejector or ejectors so as to insure that the uppermost ejector shall always be in action, provided any ejector for said coins is operated.

Another object of the invention is to provide a change making machine having devices for delivering in change five cent pieces and pennies, wherein the penny purchase mechanism automatically withdraws five cents in change from the change set up for delivery and sets the difference for delivery in pennies.

A further object of the invention is to provide a machine of the above character having a plurality of superposed ejectors for delivering five cent pieces wherein the penny purchase keys automatically operate to withdraw from action the slides controlling the uppermost ejector for the five cent pieces.

A still further object of the invention is to provide a change making machine having means wherein the coin sets for delivery a combination of coins equal in value to the coin received, with means whereby, when the purchase price is equal in value to the coin received, a purchase key may be operated to indicate the amount of purchase and subsequently the purchase key released, and the mechanism set for delivering the coins released, so that the machine is restored to normal and without operating the actuating slide for the ejectors.

These and other objects will in part be obvious and will in part be hereinafter more fully disclosed.

In the drawings, which show by way of illustration one embodiment of the invention:—

Figure 1 is a perspective view of an automatic change maker embodying my improvements;

Fig. 2 is a front view of the same, with parts broken away to show some of the interior mechanism;

Fig. 3 is an end view of the same, with the casing removed;

Fig. 4 is a vertical sectional view through the machine on the line 4—4 of Fig. 2;

Fig. 4ᵃ is a detail showing one of the levers which supports and operates the indicator;

Fig. 4ᵇ is a view similar to Fig. 4ᵃ, but showing the indicator raised;

Fig. 4ᶜ is a view in front elevation of the elbow lever, the link and the lower part of the standard to which said link is connected.

Fig. 5 is a view in vertical section and showing, more or less diagrammatically, the change setting mechanism and the devices for withdrawing from the change set the amount of the purchase price, also including the penny delivering mechanism and the dollar delivering devices;

Fig. 6 is an enlarged detail in vertical section of the upper parts of the machine;

Fig. 6ᵃ is a view showing in side elevation one of the sectoral plates.

Fig. 7 is a perspective view of certain of the parts of the machine, showing one of the coin magazines and the devices directly associated therewith;

Fig. 8 is a view, more or less diagrammatic, of the upper part of the machine, showing in top plan view the coin magazines, the coin chutes, and the devices controlled by the coins for setting the change to be delivered;

Fig. 9 is a view showing, more or less diagrammatically, the releasing means for unlocking the slides controlling the purchase keys;

Fig. 10 is a detail showing the locking means for one bank of keys and the devices for releasing the same;

Fig. 11 is a longitudinal sectional view through the controlling shaft operated by the coins, showing the means for unlocking a bank of purchase keys equal in value to the sum of a plurality of coins;

Fig. 12 is a sectional view on the line 12—12 of Fig. 11, but showing several coins about to operate the releasing mechanism;

Fig. 13 is a view showing, more or less diagrammatically in vertical section, certain of the purchase keys, the actuating plates controlled thereby, and the shiftable tumblers for engaging a different combination of actuating plates;

Fig. 14 is a similar view in plan, but showing more of the purchase key;

Fig. 15 is a view in vertical section transversely of the machine, showing the several banks of purchase keys and the actuating plates controlled thereby, and the manner of selecting certain of the plates by the action of different keys;

Fig. 16 is a view in vertical section showing the penny actuating mechanism, the automatic switch whereby nickel delivering slides are lifted when penny keys are operated, and also the war tax register;

Fig. 17 is a view in horizontal section showing the penny operating mechanism and the automatic switch mechanism for lifting out various nickel delivering slides;

Fig. 18 is a view in vertical section through a part of the machine, showing the nickel purchase key and the dime purchase key;

Fig. 19 is a vertical sectional view from the left of the machine, showing the purchase keys for values from one dollar to five dollars and the devices controlled thereby;

Fig. 20 is a horizontal sectional view through a part of the controlling mechanism for the silver dollar and dollar bill carrier;

Fig. 21 is a perspective view of the same;

Fig. 22 is a vertical sectional view showing the manually controlled means for shifting from the delivery of silver dollars to dollar bills, and vice-versa;

Fig. 23 is a plan view of the same;

Fig. 24 is a perspective view of one of the carrying cases for the dollar bills;

Fig. 25 is a perspective view showing the connection between the actuating lever and the tripping shaft;

Fig. 26 is a perspective view showing the connection between the swinging bar and the actuating member for the ejectors;

Fig. 27 is an enlarged side view showing the automatic switch for lifting out the nickel slides; and Fig. 28 is an end view, partly in section, showing the successive operations of the unlocking arms by coins of different denominations.

The invention, as illustrated, consists broadly in a change making machine which is constructed to receive coins of various denominations and bills up to and including five dollars, the bills being placed in suitable receptacles of a predetermined size. The machine includes devices whereby the coins as they pass into the machine and to the several receptacles adapted to receive the same, except the pennies, operate to set up for delivery an amount of change equal in value to the coin received, and the purchase price is, through a purchase key equal in amount to the purchase price, withdrawn from the change set up, thus permitting the delivering means to operate to eject coins equal in value to the difference between the purchase price and the coin received. When more than one coin is received in payment for a sale, the coins will set up for delivery a combination of coins equal in value to the smallest coin received, and the purchase key will withdraw from said combination set up an amount equal to the excess of the purchase price over the coins received of larger denomination. This is accomplished by the smallest coin throwing out of operation the setting devices of the coins of larger denomination.

The purchase keys are arranged in values in multiples of five up to one dollar, and in multiples of one dollar up to five dollars, and also in values of pennies from one to five. Means is provided for normally locking said keys so they cannot be depressed. The coin, or a carrying case for a bill, as it passes through its receiving chute to its retaining magazine, operates to unlock all purchase keys equal in amount to or less than the value of the coin and, if more than one coin is inserted in the machine, purchase keys equal in amount to or less than the sum of the value of the coins will be unlocked. The coins are delivered by ejectors which are connected to slides, one for each ejector. These slides are normally held raised and, when a coin is inserted, slides controlling coins, the sum of which is equal in value to the coins inserted, are lowered into position for engagement with an operating means for ejecting said coins. The operating means may be actuated, and thus change delivered equal in amount to the coin inserted, or the purchase key may be depressed, which operates to withdraw slides controlling coins, the sum or the value of which equals the purchase price, thus leaving for operation the slides controlling coins equal in amount to the difference between the purchase price and the coin or coins placed in the machine. Certain of the purchase keys are provided with devices which operate to lift from action different combinations of slides, and these devices are controlled by the coin or coins which enter the machine.

The machine is provided with a single magazine for holding nickels and three ejectors operate to deliver nickels from said magazine. These ejectors are one above the other, the upper one delivering its nickel through the lower ejectors. Each ejector is connected to a controlling slide. Certain of the purchase keys are provided with devices which will select and withdraw from action different combinations of nickel slides, and these devices are controlled by certain coins as they enter the machine.

The machine is provided with means for controlling and delivering pennies, and this means is automatically connected to the five cent piece controlling means, so that, when the penny delivering key is depressed, automatically a slide controlling a nickel is withdrawn from the change set up for delivery, and the desired number of pennies in change set for delivery. This automatic means for withdrawing a slide controlling a five cent piece is so constructed as to withdraw the slide connected to the lowermost ejector set for action so that the uppermost ejector or ejectors are always in operation.

There is a magazine for silver dollars, and other magazine for carrying cases for dollar bills. There are four ejectors for each of these magazines, and means is provided whereby, at the will of the operator, the group of slides controlling the silver dollars may be thrown in action or the group or slides controlling the carrying cases for the dollar bills may be thrown in action, and insuring when one group of slides is in action the other must be out of action.

Means is also provided whereby, when the amount paid equals the sales, the amount so paid may be put through the machine, the amount of sales indicated, and the machine set for normal action without operating any of the ejectors. Means is also provided whereby the amount chargeable to war tax may be registered in a suitable register, the amount to be registered being set, and the actuating device for delivering the coins automatically register the amount set. Means is also provided for indicating the amount of the purchase price which is controlled by the depressing of the purchase key. Means is also provided for readily withdrawing from the machine all coins and money receptacles contained in the magazine.

Referring more in detail to the drawings, the invention consists of an automatic change maker which includes a supporting base 1, on which the mechanism is mounted, and said mechanism is enclosed within a casing 2. Said casing has an upwardly projecting part with a vision opening 3 therein, into which the indicators are projected for indicating the amount of sales. Also adjacent the upper end of the casing is a series of coin receiving slots 4, there being a separate slot for the pennies, the nickels, the dimes, the quarters, half dollars, silver dollars, and carrying cases for one dollar bills, and carrying cases for five dollar bills. Also adjacent the coin receiving slots is an actuating handle 5 which is utilized for forcing coins along their receiving chutes into the coin receiving magazines, and also for releasing the set indicator of the previous sale so that it drops from view, and also for setting the change to be delivered, the change which is to be delivered being, however, controlled by the coin or coins which enter the machine.

At the front of the machine there is a series of banks of purchase keys 6, which are adapted to be depressed or forced inwardly for registering the amount of the sale, and for withdrawing from the amount of change set for delivery an amount equal to the sale or purchase price, thus leaving for delivery the right amount of change. The coins are delivered from the magazines into a delivering receptacle 7, from which they may be taken by the operator. There is a drawer 8 in the case which may be used for surplus bills, change, or the like.

At the side of the machine, there is a second actuating lever 9, which is to be utilized for ejecting the coins from the magazines, releasing the keys, and bringing the machine back to normal position for another operation. There is also a drawer 10 which extends underneath the magazines, and into which the coins may be all delivered for emptying the machine at the close of the day. There is likewise a war tax key 11 and a war tax indicator 12, by the action of which a record may be made of the amount of war tax to be deducted from the sale price as registered by the purchase key.

The coins paid by the customer are placed in the coin receiving slots 4, the coins of different denominations being placed in the slots provided therefor. A coin passes down through the slot into a chute 14. These chutes for the different denominations are similar in construction and only one of them, therefore, will be described in detail. The coin chute 14 extends to a point directly above the slide 15, and the coin passing down through the chute drops onto a plate 16 in rear of the slide, the slide normally being advanced. When the slide moves rearward, the coin is carried rearward therewith and is dropped into a magazine 17 wherein the coins are stacked one on the other.

The coins are removed from this coin magazine by an ejector, there being one ejector for each magazine, except the nickel magazine, the dollar magazines and the penny magazine. One of these ejectors is shown in Figs. 4 and 7 of the drawings and is indicated at 18. Said ejector has an opening 19 therein slightly larger in diameter than the coin, and when the ejector is at the rear end of its movement, the coin will drop into this recess 19, and when the ejector is withdrawn, it will fall from the recess into the chute 20 which leads to the delivering receptacle 7. In connection with the nickel magazine, there are three ejectors arranged one above the other, and these ejectors are all similar in construction and provided with a recess of the character indicated in connection with the ejector 18. Likewise, in connection with the penny magazine there are five ejectors so that any number of pennies from one to five may be ejected, and likewise in connection with the dollars there are four ejectors, so that four dollars may be ejected in change if desired. It is understood that there are four ejectors both for the silver dollar magazine and for the magazine receiving the carriers for the dollar bills. See Figs. 20 to 23, inclusive.

These ejectors move over a plate 21, and the coins falling into the recess in the ejector rest on the plate and are drawn rearward by the ejector. This plate 21 is made so that it may be readily removed, and thus all of the coins and bill carriers drop from the magazine. The plate here shown is of dove-tail shape and slides in dove-tail ways and is capable of being removed when the drawer 10 is unlocked and withdrawn. After this slide has been removed, the drawer is placed back, and then all of the ejectors are moved rearward into position for receiving coins and the coins will drop through the openings into the drawer, and thus the machine is readily emptied.

As noted above, there is at the upper part of the machine and adjacent the coin receiving slots an actuating lever 5. This actuating lever 5 is carried by a shaft 22 which extends lengthwise of the machine and is mounted in suitable bearings therefor. The lever 5 is rigidly attached to the shaft and serves as a means for oscillating the same. This actuating lever normally stands in the position shown in Fig. 4. After the coin has been inserted, this actuating lever is moved in a clockwise direction, as viewed in Figs. 3 and 4, and as it is moved in this direction it accomplishes two results. It releases the indicators which were set by the previous sales operation, and moves the coin rearward to a position where it will drop into the magazine, that is, it moves the slide 15 to the right, as viewed in Fig. 4.

The indicators are shown at 23 in the drawings, and these indicators are raised, when a purchase key is pressed, by mechanism which will be hereinafter more fully disclosed, and are held in raised position by means of a frame 24. This frame 24 carries a tension bar 25 which serves to hold the indicators raised, and when the frame 24 is moved to the right, as viewed in this Fig. 4, the tension bar 25 will be released from the indicators and they drop of their own weight. Mounted to slide in suitable supporting devices therefor is a bar 26. A spring 27 normally forces this bar to the left as viewed in Fig. 4. The bar at its outer end is connected at 28 to the frame 24. At its inner end said bar is slotted at 29 to straddle the shaft 22. On this bar is a pin 30 which lies in the path of movement of the actuating lever 5. Therefore, when the lever 5 is turned to the right, as viewed in Fig. 4, it will move the bar 26 to the right and thus move the frame 24 to the right, releasing the indicators so that they will drop. A latch 31 drops into locking engagement with the frame and normally holds the same with the indicators raised until they are reset, and the resetting of an indicator, through the operating of a purchase key, releases the latch so that the frame moves forward to hold the indicators raised.

The manner in which the actuating lever 5 moves the slide 15 is as follows: Near the outer end of the shaft 22 there is a segment gear 32 (see Fig. 7), which segment gear has a lost motion connection with the shaft 22. Said segment gear is provided with a sleeve having a circumferential slot, and a pin on the shaft extends into this slot, the slot being longer than the diameter of the pin provides a slight lost motion. This segment gear 32 meshes with a pinion 33 on a shaft 34. The shaft 34 (see Fig. 4) is provided with arms 35, one for each magazine, and these arms are connected by links 36 to ears or lugs carried by the slides 15. Each slide 15 has a forwardly extending plate 37 which supports the coin dropped in the slot when the slide is rearward. On the forward movement of the slide, the coin drops in rear thereof so that, when the slide moves rearward, it will be carried into the magazine. When the actuating lever is moved back, it will rock the shaft 34 through the action of the segment and pinion, and this will move all of the slides rearward and carry rearward all coins which have been placed in the machine, causing said coins to drop into their respective magazines. This lost motion is for the purpose of permitting the actuating lever to be moved from the normal position, shown in Fig. 4, to the left without actuating the slides, which is for the purpose of actuating the setting mechanism hereinafter described. The rearward movement of the lever from the normal position shown in Fig. 4 will move the slides.

Extending across the upper end of the machine is a cross bar 38 which is associated with all of the change setting rods, and this cross bar is depressed by the actuating lever 5 when moved to the left, as viewed in Fig. 4. Said shaft 22 is formed with two projecting arms 39 which overlie the cross bar and which serve to engage the cross bar and force it downwardly when said actuating lever is moved to the left from the normal position, as indicated in Fig. 4. If, however, this actuating lever is moved to the right, as above described, no movement will be imparted to the cross bar.

Associated with each magazine is a change setting rod 40 (see Fig. 7). Also associated with each ejector 18 is a slide 41. These change setting rods are adapted to lower and raise the ejector operating slides. The change setting rods are all substantially the same in construction, and the description of one will answer for the others. Each rod is made in two sections which are joined by means of a screw 42 passing through a slot 43. The rod at its lower end is provided with a pin 44 which engages a slot 45 in the slide 41. The rod is normally raised by means of a spring 46 and the raising of the rod lifts the slide. The rod at its upper end slides in a swinging tube 47 which is pivoted at 48 to the cross bar 38. The rod is formed with a shoulder 49 which is below the lower end of the tube. If the tube is swung to the left, as viewed in Fig. 2, it will engage the shoulder 49 and the downward movement of the tube will impart a downward movement to the rod 40 against the tension of the spring 46, and thus lower the slide 45. The rod is locked in its lower position by means of a locking pin 50 (Figs. 4 and 6). Said locking pin engages a notch, indicated at 51 in Fig. 18 of the drawings, in the rod and is for the purpose of holding the rod depressed or lowered after the cross head 38 has been released and returned to its normal raised position.

The purpose of forming the rod in two sections joined by the screw 42 and the elongated slot 43 is to permit the slides to be raised, although the upper part of the rod is locked down by the means just described, so that these slides which are set by the downward movement of the cross head for delivering the coins may be raised from their set position before the change setting rods are released. The cross head 38 slides on posts 52, Fig. 2, one at each end of the machine, and a spring 53, encircling each post, normally raises the cross head to its extreme upper position, which is limited by pins at the top of the post.

The slide 41 is connected to the ejector 18 by means of a link 54. Associated with all of the slides is an actuating member 54ª which extends from one end of the machine to the other, and this actuating member is moved back and forth sidewise, that is, the member extends from side to side of the machine and has a movement at right angles to its length. There is a flange 54ᵇ at the rear edge of the actuating member and a flange 54ᶜ at the front edge of said actuating member. The slides, when they are lowered, drop between these flanges so that any back and forth movements imparted to the actuating member will likewise be positively imparted to the slides to move them endwise, back and forth, and thus move the ejectors. When, however, the slides are raised, they are above the path of movement of these flanges 54ᵇ and 54ᶜ and, therefore, remain idle. There is a housing 41ᵃ extending over the slides, which housing is formed a depending flange 41ᵇ and a depending flange 41ᶜ. These depending flanges of the housing serve to positively hold the slides from endwise movement when they are raised. Means for moving the actuating members 54ᵃ back and forth will be described later.

The tubes 47 carried by the cross head are controlled by the coins which are inserted in the coin receiving slots so that only tubes associated with certain of the change setting rods will be swung into operative position when a predetermined coin is placed in its receiving slot. As above noted there is a swinging tube for each magazine, except the penny magazine.

Associated with each coin chute is a controlling shaft 55. This controlling shaft 55 carries an arm 56 which is fixed thereto, and said arm is provided with a spring wire 57 which engages between the forked ends of a bracket 58 secured to the swinging tube. When the shaft 55 is moved in one direction, the tube will be swung over the shoulder, and if the shaft is moved in the other direction, then the tube is moved so as to escape the shoulder and permit the tube to slide down on the rod. This shaft 55 is controlled by two arms 59 and 60 which extend into the path of movement of the coin. As the coin is forced along the guideway therefor by means of the slide 15, it will engage first the arm 59, and this will swing the arm 56 and the spring wire 57 so as to move the tube with which said wire is connected to bring the lower end of the same over the shoulder on the setting rod associated with this coin receiving slot. Means is also provided for swinging other tubes through the movement of this arm 56, which will be later described. As the arm 60 is engaged by the coin, the arm 56 will be moved in the opposite direction, and this will swing the swinging tube so that the shoulder will clear the end of the tube and the tube passes down over the setting rod.

Each arm 56 of the half dollar, quarter, dime and nickel magazine is provided with a link 61 (Fig. 8). These links are fixed to one of its respective arms and has a lost motion connection with the other. That is to say, one link is fixed to the quarter controlled lever and has a lost motion connection with the half dollar controlled lever. Likewise, the link is connected to the dime controlled lever and has a lost motion connection with the quarter controlled lever. The dollar and dollar bill controlled levers are connected for movement in unison. The five dollar controlled lever has a lost motion connection with the dollar controlled levers. When the levers to which the links are positively connected move to the left, all the levers associated with coins of a lesser denomination are moved to the left, but none of the levers of higher denominations will be moved. On the other hand, when the lever is moved to the right all the levers of the coins of lower denomination have no movement, but all of the levers which have been shifted of the coins of higher denomination will be moved to the right.

The operation of these devices will be apparent from a concrete example, as for instance: Let us suppose that a half dollar is placed in the half dollar receiving slot, and as it is moved along by the slide 15, which forces it by the arms 59 and 60, it will engage the arm 59 and swing the arm 56 associated therewith to the left, and this will swing the arms of the quarter magazine, the dime magazine, and the nickel magazine so as to bring the swinging tubes over the shoulders of the setting rods associated with these different magazines, but owing to the lost motion connection between the link of the half dollar and the dollar combinations, these arms 56 of the dollar combinations will not be moved by the half dollar. When, however, the coin passes the arm 60, then it moves the arm 56 associated therewith to the right, and this will shift the swinging tube of this magazine so as to cause it to clear the shoulder, but owing to the lost motion connection between the links of the coins of lower denominations will leave these denominations set and undisturbed. In other words, as the half dollar passes through from its receiving chute to the magazine, the coin itself sets the tubes for engaging with the coin setting rods of the magazines which will set up for delivery change equal in amount to the value of the coin received. In case of the half dollar passing through to its receiving magazine, all of the swinging tubes associated with the quarter magazine, the dime magazine and the nickel magazine will remain set. Therefore, when the cross head is moved downwardly, these rods will be lowered and the slides connected thereto will be lowered. The inserting of a half dollar into the machine sets for delivery in change a quarter, a dime and three nickels. Likewise, the inserting of a dollar in coin, or a dollar bill in a bill carrying receptacle, will set for delivery in change a half dollar, a quarter, a dime and three nickels.

Let us assume, however, that the amount of the sale is sixty-five cents, and the coins offered in payment are a half dollar and a quarter. As these two coins, the fifty-cent piece and the quarter, pass through to their receiving magazines, they will operate the arms 59 and 60 associated therewith, and the swinging tubes of the half dollar and quarter, dime and the nickels will all be moved over the shoulders on their respective setting rods as the coins pass the arm 59. As the coin passes the second arm 60 for the quarter, it will move the swinging tube associated therewith so as to free it from the shoulder, and through the connecting link with the fifty cent controlling arm will likewise move the swinging tube of the fifty cent magazine so it will clear the shoulder on the setting rod. In other words, the coin of the lower denomination kicks off the swinging tubes of higher denomination which were set by the half dollar.

This same action occurs in connection with various combinations of coins, the lowermost coin in value through the connecting links and lost motions referred to always kicks off any tubes which have been set by the coins of higher denomination, and this insures that the change set for delivery is only equal in value to the smallest coin put into the machine. It will readily be seen that this very much simplifies the machine and does away with unnecessary moving parts, and also provides a means whereby the proper amount of change may be delivered in connection with any purchase wherein a plurality of coins is received in payment.

If the purchase price is sixty-five cents, and a half dollar and a quarter are given in payment, the change in excess of the sales price over fifty cents, or the coin of higher denomination, is taken from the twenty-five cents or the coin of lower denomination. This will always work out in various combinations, as is perfectly obvious, as the smaller coin will not be paid in unless the purchase price is greater than the value of the larger coins and, therefore, the change to be returned will be less than the value of the smallest coin.

If three quarters are given in connection with a sale of sixty-five cents, the same transaction will take place, that is to say, the amount of change is necessarily less than twenty-five cents and is taken from the setting of change for delivery of twenty-five cents in value. This, however, is accomplished by the pushing of the sixty-five cent sale key, as will appear hereinafter more fully.

As above noted in connection with the nickel magazine, there are three ejectors and, as a consequence, there are three setting posts associated with these three ejectors and three slides controlled thereby. These three ejectors being one above the other must be operated in a certain predetermined order. In other words, the uppermost nickel ejector must be always in action if any ejectors are used. The setting post $40^a$ is connected with the slide which controls the uppermost ejector or the ejector for what will be hereinafter termed nickel #1. The setting post $40^b$ controls the slide for the second ejector or nickel #2, and the setting post $40^c$ controls the slide for the lowermost ejector or nickel #3.

Referring again to Fig. 8, it will be noted that the swinging tube 40 associated with the dime magazine is conected by the link 62 with the swinging tube $40^c$. The swinging tubes $40^a$ and $40^b$ are connected by a link 63 so that these two tubes swing together. The arm 56 associated with the nickel magazine is connected to the tube $40^a$ for the purpose of swinging this tube.

When a dime is inserted in the machine, it will swing the tube associated therewith and this, through the link 62, will swing the tube $40^c$ to bring the same over the shoulder on the setting post 40 associated therewith, and through the link 61 will also swing the arm 56 associated with the nickel magazine, and through this arm swing the tubes $40^a$ and $40^b$ over the shoulders on the respective posts with which they are associated. As the dime passes the rear shoulder or arm 60, it swings the arm 56 connected thereto to the right, and this trips off the swinging tubes associated with the dime setting post, and the swinging tube $40^c$, leaving set for operation the tubes $40^b$ and $40^a$ and, as above noted, these tubes control the slides connected to the two uppermost ejectors in the nickel magazine. Furthermore, it will be noted that, when the nickel is inserted in the chute leading to the nickel magazine, it will swing the arm 56 associated therewith, first to the left and then to the right, and as it swings to the right it will operate to release all of the swinging tubes, including all three swinging tubes for the nickel so that no slides will be dropped. If the sale is fifty-two cents, and fifty cents and a nickel is received, the only change to be given is pennies, and, therefore, no nickel slide is set up, the nickel operating to kick off all the setting tubes.

The arm 56 associated with the nickel magazine is provided with a second arm 65 projecting laterally therefrom to the end of the machine, where it is in range of the actuating lever 9, the purpose of which being that said lever 9, when swung rearwardly, will engage the arm 65 and swing all of the setting tubes to release the same from the shoulders of the setting rods and permit the setting rods to raise to normal position for another operation of the machine.

From the above, it will be apparent that the change making machine is provided with mechanism automatically operated by the coins themselves as they pass into the machine to the magazines therefor whereby, when a single coin is placed in the machine, it sets up for delivery, that is, drops slides into position to be actuated which control coins equal in value to the coin admitted into the machine, and when a plurality of coins are received the coin of the lowest denomination sets up or drops slides for actuation which control coins equal in value to the value of the lowest coin received.

After a sale has been made, one of the purchase keys is pressed inwardly, which purchase key corresponds to the amount of the sale, provided the sale is between five cents and one dollar. If the amount of the sale is not an even multiple of five, then penny keys are used. On the other hand, if the amount of the sale is more than a dollar, then dollar keys will also be used. The keys controlling the coins from five cents to a dollar will first be described. These keys, as indicated in Fig. 1 of the drawings, are arranged in five banks, the first bank containing the nickel and dime keys; the next bank a plurality of keys in multiples of five, from fifteen to twenty-five; the next from thirty to fifty; the next bank from fifty-five to seventy-five, and the next bank from eighty to one dollar.

The operation of these several keys and the mechanism controlled thereby is similar, with the exception that various combinations are formed so as to bring about different actions when the keys are depressed. It may be stated that the purpose of the purchase key is to withdraw from the change set up for delivery an amount equal in value to the purchase price, leaving for delivery the right amount of change. Another function of the purchase key is to set an indicator which shows the amount of the sale.

Referring to Figs. 7 and 18, each purchase key consists of a sliding key rod 66 which is normally forced outwardly by means of a spring 67. At the inner end, each key rod is adapted to bear against the end of a sliding rod 68 which, when moved endwise, raises an indicator equal in value to the sales key. This sliding rod 68 actuated by the sales key operates in turn upon a swinging elbow lever 72. This lever is pivoted to the frame at the elbow and carries a block 72ª which is adapted to be engaged by the sliding rod 68. The other member 72ᵇ of this elbow lever is pivoted at 70ª to a link 70, and the link is in turn pivoted at 70ᵇ to a standard 71 carrying the indicator 23. This block 72ª has a square face and is so positioned relative to the rod 68, that when the rod is forced to the right as viewed in Fig. 4ª, it will move this block to substantially horizontal position. The tension bar 25 bearing against the square face of this block will prevent it from swinging back to normal position until said tension bar is moved out of contact with said block. As a result, the tension bar will hold the parts in the position shown in Fig. 4ᵇ, that is, with the indicator raised. When the tension bar is released by means of the actuating lever 5, in the manner which has been described above, then the block will be released and the indicator will drop. Springs 73 serve to lower the indicators and move the rods 68 forwardly to their normal position when released.

Associated with each bank of purchase keys is a series of hanging sectoral plates 74. These groups of sectoral plates are mounted to swing freely on a supporting rod 75. Directly beneath the sectoral plates and extending the full length of the machine is a series of rocked bars 76. There are six of these rocker bars. Each rocker bar has an upwardly extending arm 77. Adjacent the forward end of the machine is a rock lever 78, and a link 79 connects the upper end of the arm 77 with this rock lever. The rock lever 78 is pivotally supported upon a bracket 80, and the horizontal arm of said rock lever is formed with a slot 81 adapted to engage a pin 82 carried by the setting rod 40. It will be understood that there is an arm 77 on each one of these rocker bars, and each rocker bar is connected to a slide. As viewed in Fig. 18, the three rocker bars at the left are connected to the three slides, respectively, which in turn are connected to the ejectors associated with the nickel magazine. The next rocker is connected to the slide which in turn is connected to the ejector associated with the dime magazine, while the next rocker is connected through a similar train of mechanism with the ejector of the quarter magazine, and the right hand one, as viewed in this figure, is connected through a similar magazine with the ejector for the half dollar magazine. When any one of these rockers is oscillated in a clockwise direction, as viewed in said Fig. 18, the rock lever 78 will be turned in a similar direction and will raise the lower half of the setting rod, the screw and slot connection permitting this raising of the lower section although the upper section of the setting rod is locked against movement by the pin 50. A spring 83 normally forces the lower portion of the setting rod and the slide downwardly when the rockers are released and returned to their normal position. This spring, however, is of less strength than the spring 46 so that the spring 46 will raise both sections of the rod when the upper section is released. In other words, the spring 83 merely holds the screw 42 at the upper end of the slotted connection between the two sections when the slides are free from control by the rockers.

Each of the rockers 76 is also provided with an upwardly projecting arm 84 (see Figs. 7 and 15). The several sectoral plates are associated with different rockers. One of the sectoral plates has a pin 85 engaging the arm on the rocker which controls the slide for the half dollar magazine; another sectoral plate has a pin engaging an arm which controls the slide for the quarter magazine, and likewise the other sectoral plates controlling the dime magazine and the three ejectors for the nickel magazine. Certain of the sliding key rods 66 are provided with pins for engaging certain of the sectoral plates when they are pressed in, while other key rods are provided with pins which engage other sectoral plates when they are pressed in. The key rods are indicated at 66 in Fig. 15, and it will be noted that each key rod has a pin 86 rigidly carried thereby, except certain of the keys are provided with tumblers having more than one pin, which tumblers will be later described. Certain of the sectoral plates are also provided with elongated slots 87, see Fig. 15, so that a pin passing through the slot may have its full range of movement through the action of the key rod without engaging and moving the slotted sectoral plate. In Fig. 6ª there is shown one of the sectoral plates 74 in side view. It will be noted that the slot 87 extends in from the edge of the plate and is in line with one of the pins 86ᵇ. The slots in the several plates 74 are placed so as to properly suit the combination intended, so that certain keys may be pressed in without swinging the sectoral plates, as the pin 86 will pass into the slot. If, however, there is no slot opposite the pin, then the pin will strike the plate and cause it to move. Each key as suggested above, has its own combination and will engage the sectoral plates in accordance therewith. The sectoral plates as has been noted above, are in groups of five, and the pin 86 will sometimes strike all five plates, causing them to be operated. The slots are shown in Fig. 15, and as is suggested above, when a pin passes into the slot, it will have its full range of movement through the action of the key rod without engaging and moving the slotted sectoral plate.

For example, if the thirty cent key rod, indicated in Fig. 15, is moved inwardly, the pin 86 will engage and move the sectoral plates controlling the quarter slide and the nickel slide, which means that these sectoral plates will be swung, and through their connecting links with the rock levers associated therewith, they will raise the quarter and nickel controlling slides from action, thus withdrawing from the change set up for delivery by the dropping of the slides, an amount equal in value to the sales price. When this thirty cent push rod moves inwardly, it has no effect on the dime slide because the slot 87 which has been described heretofore. Then again, the thirty-five cent key rod carries a pin which is of sufficient length to engage and operate the sectoral plates controlling the quarter ejector and the dime ejector. The forty-five cent key rod has a pin of greater length which will engage and operate the quarter, the dime and two of the nickel sectoral plates. In the bank of keys which include sales keys up to seventy-five cents, it will be noted that there is a sectoral plate which controls the slide for ejecting fifty cents, and the key rods associated with this group of sectoral plates will operate various combinations of plates, including this fifty cent controlling sectoral plate, making up an amount equal to the sales price.

It will thus be noted that, if a single coin is received, say fifty cents, and inserted into the machine, it will operate through the setting rods to set up for delivery by dropping the controlling slides therefor, a quarter, a dime and three nickels. These slides, if moved rearwardly and forward again, would eject fifty cents in change. If, however, the thirty-five cent purchase key be pushed inwardly, it will, as above noted, operate upon the quarter controlling sectoral plate and the dime sectoral plate, and move these plates backwardly, and they in their swinging movement, through the connecting mechanism with the slides, will raise the quarter slide and the dime slide, which were lowered by the coin going into the machine, leaving in their lowered position only the three nickel slides. If the coins received in payment of the sale should be a quarter and a half dollar, and the sale amount to sixty-five cents, then the following action occurs: The half dollar going into the machine swings the tubes associated therewith, so that it escapes the shoulder on the fifty-cent setting rod. The quarter swings its setting tube clear of the shoulder on its setting rod. The quarter, however, sets for operation the swinging tubes for the dime and the three nickels.

If, now, the purchase price is sixty-five cents, when the key rod corresponding to sixty-five cents is moved inwardly, it will, as clearly shown in Fig. 15, swing the dime sectoral controlling plate and one nickel sectoral controlling plate. This means that the dime slide and one of the nickel slides will be raised, leaving for delivery two nickels. The half dollar slide was not lowered and, therefore, the action of the sectoral plate thereon is ineffective.

The particular feature to be noted is that the change left for delivery is the two nickels, and that this change was deducted from the combination of coins set up for delivery by the coin received of lowest denomination. This same action occurs through all combinations of coins which may be placed into the machine, that is, the change is always deducted from the slides set up for actuation by the coin of lowest denomination and the amount of change deducted is the difference between the sales price and the sum of the values of the coins received above the lowest denomination. As in the example stated, sixty-five cents is fifteen cents in excess of the fifty cent piece received and this fifteen cents was deducted from the quarter set up for delivery, leaving the two nickels or ten cents in change.

On certain of the key rods, as, for example, the half dollar key rod, the quarter key rod, the dime key rod and the nickel key rod, there are tumblers which are automatically shifted by means of the coin inserted in the machine for the purpose of bringing projecting pins carried thereby and of different lengths into cooperative action with the sectoral plates so as to select and operate different combinations of sectoral plates when these tumblers are shifted from one position to the other. These tumblers are in the form of a sleeve 88 (Fig. 14) which is mounted upon the key rod so as to rotate freely thereon, and a spring 89 surrounding the key rod, attached at one end to the key rod and at its other end to the sleeve of the tumbler, normally rotates the tumbler in a counter-clockwise direction, as viewed in Fig. 15.

The setting rod associated with the dollar magazine is provided with an arm 90 which projects rearwardly and downwardly and carries a pin 91 which overlies a projecting lug 92 carried by the sleeve of the tumbler. This rod 90 carried by the setting rod of the dollar magazine is associated with the half dollar purchase key and operates the tumbler thereof. There is a like arm 90 on the setting rod for the fifty cent magazine which cooperates with a similar tumbler on the quarter key rod. There is a similar arm 90 on the setting rod 40c associated with the nickel magazine, and this rod carries two pins 91 (right of Figures 13 and 15) which are adapted respectively to operate the tumblers on both the dime key rod and the nickel key rod. The tumbler associated with the half dollar key is provided with a projecting pin 93 and a second projecting pin 94. These pins are at right angles to each other. When the tumbler is in the position shown in Fig. 15, the pin 94 will engage all of the sectoral plates controlling the ejectors for the quarter and ten cent and three nickels. When, however, the dollar setting rod is lowered, then this tumbler, through the arm 90, will be rotated through an angle of ninety degrees bringing the pin 94 to inoperative position, and also moving the pin 93 to horizontal position where it will engage the sectoral plate connected to the ejector for the half dollar only.

Perhaps the operation of this tumbler will be best understood by a concrete example. Let us suppose that a fifty cent piece is received into the machine. This sets for delivery, a quarter, a dime and three nickels. If the fifty cent purchase key be depressed, it will move from action all of the slides, thus lifting the quarter, the dime and the three nickel slides, because the long pin operates upon the sectoral plates coupled to these slides. If a silver dollar be received into the machine, it will set for downward movement the half dollar setting post, the quarter setting post, the dime and three nickels and, therefore, the slides associated therewith will be dropped so that a dollar in change could be obtained. If, now, the fifty cent key is depressed or pushed inwardly, it will remove only the slide from the combination which controls the fifty cent piece, because the tumbler has moved through an angle of ninety degrees and the short pin 93 is brought into operative position, while the long pin 94 has been moved to inoperative position by reason of the downward movement of the setting bar associated with the dollar magazine. Similar actions occur in connection with the other tumblers, and the purpose thereof will be described later.

As has already been stated, there are five ejectors associated with the penny magazine, and these ejectors are similar in construction to the nickel ejectors described above. These ejectors are indicated at 95 in Fig. 16 of the drawings. Connected to each ejector is a slide 96. This connection is effected by means of a link 97. There are five penny key rods 97a, (Fig. 16), and these key rods are normally forced outwardly by means of springs 98. Associated with these key rods are five levers 99. Theses levers are arranged side by side and are pivotally supported by a rod 100. Each lever has a projecting rod or hook 101 which extends beneath a short lever 102 pivoted at 103 to a suitable bracket 104. This lever has a slot 105 engaging a pin 106 carried by a vertical rod 107 which in turn carries a pin 108 running in a slot 109 in the slide 96. There is a lever 99 for each slide, and if a lever 99 is swung to the right, as viewed in Fig. 16, it will lower the slide with which it is associated. This in a sense is just the opposite in action from the key rods which have been described in connection with the sales in multiples of five. In other words, the penny key rods drop the slides into position to be actuated.

The key rods for the penny slides are each provided with a pin 110, and this pin is of sufficient length to overlie four of the levers 99 so that, when this penny key rod is forced inwardly, it will swing these four levers and drop the slides for action which are connected to the four topmost ejectors for the penny magazine. The two cent key rod carries a pin 110 which is of sufficient length to overlap three of the levers and trip the three slides connected with the three topmost ejectors. Similarly, the other key rods are provided with pins of such length as to operate the proper number of levers; the five cent key rod operating all five levers, dropping all five slides and resulting in the ejection of five pennies. Of course, this five cent key rod is only depressed when five cents in penny change is desired.

In the making of change, let us assume that the sales price was forty-seven cents and a half dollar is received in payment thereof. When the half dollar passes into the machine, it will drop slides which control the ejection of a quarter, a dime and three nickels. Now, if the forty-five cent purchase key be pushed inwardly, it will withdraw all of the slides except the #1 nickel slide. Then the two cent penny key is pushed inwardly, thus making up the purchase price of forty-seven cents. As this key moves inwardly, it not only drops three penny slides, but it withdraws the nickel slide which was down in the combination set by the half dollar as it went into the machine, so that only three pennies will be delivered in change.

This lifting out of the nickel slide is automatically accomplished by the penny controlled mechanism and in the following manner: Mounted to slide upon a rod 111 is a sleeve 112. This sleeve is normally forced to the left by means of a spring 113. This sleeve is provided with a rigid hook 114 which is adapted to engage the pivot pin 115 connecting the link 79 to the arm 78 of the slide controlling the delivery of nickel #3, that is, the lowermost ejector. The link 79 is provided with a slot 116 which receives a pivot pin that connects the link to the upstanding arm 77 of the rocker bar. This slotted connection between the link and the arm of the rocker bar will permit the link to move endwise to a certain extent without shifting the rocker bar. If, therefore, the sleeve 112 moves to the right, as viewed in Fig. 16, compressing the spring 113, it will carry with it the hook 114 and this hook 114 will engage the extended pivot pin 115, swing the arm 78 and lift the slide 96 with which it is associated. The sleeve 112 is provided with an upwardly projecting arm 117 and this arm is connected by a link 118 with the lever 99 associated with all the penny keys so that, if any one of the penny keys is depressed, the sleeve 112 will be pushed to the right and withdraw the nickel slide which is associated with the hook 114. On this sleeve 112 is a pivoted hook 119. Said hook is pivoted at 120 and has a depending finger 121. The rocker frame connected to the slide of the #3 nickel, that is, the lowermost ejector, has an upwardly projecting pin 122 which engages the finger 121, and throws down this hook 119, a spring normally holding the hook raised. This hook 119 operates in a similar manner to the hook 114, but lifts the slide connected with the middle ejector. There is likewise a similar hook pivoted at 120 to the sleeve and having a depending finger 121 which is adapted to be engaged by a pin 122, and this hook is associated with the slide connected to the topmost ejector. If the slide connected with the middle ejector is raised, this is accomplished by the oscillation of the rocker frame associated therewith, and as this rocker frame moves it throws down the third hook and positions the same for lifting out the slide of the topmost ejector. Through this automatic lifting out of the various nickel slides, the following function is accomplished:

Let us assume that there is change set for delivery which includes three nickels and the sale includes a penny combination, then when a penny key is depressed through the fixed hook the slide controlling the lowermost ejector for the nickels, or what has been referred to as nickel #3, will be raised and put out of operation, and penny slides will be dropped to give the right amount of change in pennies. Then again, if the change set for delivery includes only two nickels, this necessarily means that the slide connected to the middle ejector and the topmost ejector are down and this other slide, which was operated upon by the stationary hook, is raised. The same action which raised the slide connected to the lowermost ejector throws into action the second hook which operates to lift the slide connected to the middle ejector, and on the other hand, if the change set for delivery included only one nickel, the raising of the slide connected with the middle ejector throws into action the third hook which would lift out the slide connected to the topmost ejector when penny change is to be given.

From the description already given in connection with the penny delivering mechanism, it will be noted that whenever a penny key is pressed inwardly to give pennies in change, a nickel slide is lifted from the change already set for delivery and, therefore, if the proper change is to be delivered there must always be in action, when change is set for delivery, a nickel controlling slide. The tumbler carried by the half dollar key rod and the tumbler carried by the quarter key rod are for the purpose of insuring that a nickel will always be left in change for delivery after a purchase, or sales key has been depressed.

For example, if a half dollar is placed in the machine and the fifty cent purchase key depressed, the tumbler on this fifty cent key is set so as to withdraw the quarter, the dime and three nickel controlling slides. If, however, a dollar is received and placed in the machine, then the tumbler is switched so that, when the fifty cent key is depressed, it withdraws from action only the slide connected with the half dollar magazine, leaving for deliverey the quarter, the dime and three nickels, so that in the change set for delivery there is a five cent piece and a penny key can be depressed, the nickel slide raised, and the penny change deducted therefrom. If it were not for this tumbler, the fifty cent key when depressed, when a dollar is received into the machine, would withdraw the slides for all the nickels and leave no nickel slide in action from which the penny change could be deducted. The same is true of the tumbler of the twenty-five cent key rod which is controlled by the half dollar as it goes into the machine.

As has already been noted, there is a tumbler on the dime key rod and also a tumbler on the nickel key rod, and these two tumblers are controlled by the setting rod associated with the slide connected to the lowermost ejector or nicked #3. If a dime is received into the machine, it will lower the slides connected with the two topmost ejectors only, and the tumbler is set on the ten cent key so that, if this is forced inwardly, it will withdraw both slides which are set for actuation. If the nickel key rod is pushed inwardly, the tumbler thereon is set so as to lift out the slide controlling nickel #2. If, however, any coin above a dime is received into the machine, then all three setting posts associated with the nickel magazine move downwardly, and as the setting post associated with the lowermost slide moves downwardly, it will operate the tumblers on both the dime key rod and the nickel key rod, shifting the same, so that, if the dime key rod is forced inwardly, it will withdraw from the combination two slides controlling the nickels, but it will withdraw the two slides connected to the two lowermost ejectors so as to leave in action the topmost ejector so that it can deliver its coin. On the other hand, if the nickel purchase key is pushed inwardly, the tumbler has been positioned so that it will raise from action the slide connected to the lowermost ejector only, leaving set for actuation the slides connected to the two topmost ejectors. The above is for the purpose of insuring the setting for actuation of slides of the uppermost ejectors, and this must be so as the lowermost ejector cannot operate except when it operates in conjunction with the ejectors above the same. The same is true of the middle ejector which must operate in cooperation with the topmost ejector.

The means for controlling the delivery of silver dollars or the delivery of carrying cases C for the dollar bills will now be described. Associated with the three magazines for the silver dollars, or carrying cases for the paper dollars, and the carrying cases for the five dollar bills, is one setting post 47 Fig. 8. The arm 56 associated with the dollar magazine is connected by a link 129 to the arm 56 associated with the magazine for the carrying cases for the paper dollars, and this link is pivoted at both ends without lost motion so that these arms will move in unison. There is a link 130 connecting the arm 56 associated with the carrying cases for the dollar bills to the arm 56 associated with the carrying cases for the five dollar bills, and this link has a lost motion connection with the carrying arm of the five dollar magazine.

From the above, it will be apparent that when a silver dollar passes into the magazine therefor, it will swing the arm 56 to the right, setting all the posts associated with the half dollar, the quarter, the dime and the nickel magazines, but this silver dollar will kick off the swinging tube associated with the post 47 for dropping the slides controlling the delivery of the dollar bills and the silver dollars. The same occurs when the carrying cases for the dollar bills are received into the machine.

When a carrying case for a five dollar bill passes into the machine, it will swing the arm 56 associated with this magazine and through link 130 will cause the setting for action of all the setting posts. The link 130 having a lost motion connection will be ineffective to swing the arms 56 when the coin passes the arm 60 associated therewith.

Referring more particularly to Figs. 20 and 21, the slides 131 are associated with the ejectors for the silver dollars. There are four ejectors, one above the other, similar to the ejectors for the nickels. There are four slides 132 which are connected to the ejectors for the carrying cases for the dollar bills, and there are four of these ejectors, one above the other, operating similarly to the ejectors for the silver dollars. These slides are substantially the same as the slides 41 which have been described above, and they are, when lowered, in range of the actuating member 54ª and will be moved back and forth thereby, thus causing the ejection of the coins or cases. The topmost slide for ejecting the silver dollars is connected by a yoke 133 to the topmost slide for causing the ejection of the cases carrying the paper dollars. Likewise, the second slide controlling the second ejector from the top in the silver dollar magazine is connected by a yoke 134 to the slide controlling the second ejector in the magazine for the dollar bills. There are similar yokes 135 and 136 which join the other slides. Each yoke is connected with its respective slide by a pin 137 which passes through the slots 45 in the slide and through a vertical slot in the end of the yoke. Each yoke has a forwardly projecting arm 138. The setting post 47 associated with the five dollar carrying cases carries a pin 139 which extends under the lowermost arm 138. When this post is raised through the action of the spring thereon, all of the yokes are lifted, and this holds lifted from action all of the slides connected to the yoke through the slots and pins. When, however, this setting rod is lowered, then all the yokes will drop and the slides associated therewith will likewise be dropped, both groups of slides dropping at the same time.

There are four rocker bars 140 which are separate and independent from the rocker bars 76, although substantially in endwise alinement therewith. These rocker bars are each provided with a post 141 carrying a block 142 which is adjustably secured thereon, and a link 143 is pivoted to this block and at its other end is pivoted to an arm 144 carried by a sleeve 145, and this sleeve 145 carries an arm 146 provided with a pin 147 which extends underneath the arm 138 on the yoke. It will be clear from Figs. 20 and 21 that there are four sleeves, one within the other, and these sleeves are all independently movable. If the rocker at the left in Fig. 21 is oscillated, it will oscillate the inner sleeve, and the inner sleeve will raise the lower yoke engaging the yoke above the same, or rather the arms projecting therefrom, will raise all of the other yokes. This rocker bar is adapted to be operated by a sectoral plate, such as described above, through the depressing of the four dollar purchase key, which is indicated at 148 in Fig. 19 of the drawings. If the next adjacent rocker bar be oscillated, which is accomplished by depressing or moving inwardly the three dollar sales key, then the sleeve immediately carried by the inner sleeve will raise the yoke #3 (numbering the same from the top down), and all the other yokes above the same, and thereby lift out of action three slides, leaving one slide in action for delivering a dollar in coin or a dollar bill. It will be understood, of course, that at the same time that these slides are operated, the slide controlling the half dollar, the quarter, the dime and the three nickels are down, if the change is even dollars, and these will all be actuated so that when five dollars is put in and a three dollar purchase key is depressed, one silver dollar or one paper dollar and one dollar in change will be delivered.

Suppose the sales price, however, was one dollar and sixty cents and a five dollar bill is given in paper therefor. The five dollar carrying case drops all four slides controlling either the silver dollars or the carrying cases for the dollar bills, and also all the slides controlling a dollar in change. The operator pushes first the dollar key and then the sixty cent key. The inward movement of the dollar key lifted one slide only, leaving three dollar slides set for delivering three dollars in change. The sixty cent key as it is moved inwardly, will lift the slides of the fifty cent magazine and the dime magazine, leaving for delivery a quarter and three nickels, and then when the actuating member for the slides is operated, the ejector set for action will deliver three silver dollars, or three one dollar bills, and forty cents in change. It will be perfectly obvious how any combinations may be operated from the description given above by depressing the penny key corresponding to the amount of sale in pennies over the one dollar and sixty cents stated in the above example. In other words, when a two cent key is depressed, it takes out of the change set for delivery a nickel and puts into action three penny slides for ejecting three pennies, and in the example above given if the sales price is one dollar and sixty-seven cents, three dollars, a quarter, a nickel and three pennies will be delivered.

From the above, it will be apparent that both the slides controlling the delivery of the silver dollars and the paper dollars are simultaneously controlled and set or lifted from set position. In order that one group of slides may be rendered ineffective when the others are in action, means is provided for lifting and holding out of action either one group entirely or the other group. This means consists of two push keys 149 and 150 (Figures 1, 22 and 23). These keys are connected by a cross lever 151 pivoted intermediate its ends at 152 so that, when one key is pushed inwardly, the other is withdrawn. Referring to Figs. 22 and 23, it will be noted that there are two vertical posts 153 connected to each end of the two pins 137$^a$. There is a pin 137$^a$ for each group of slides. These posts project vertically and are adapted to be operated by a shaft 154 carrying arms 155. The arms 155 are provided with pins 156 engaging slots 157 in the posts. This rock shaft has a depending arm or arms 158 which are connected to the push keys 149 and 150. The pin 137$^a$ associated with one group of slides is connected to one push rod, while the pin associated with the other group of slides is connected to the other push rod. When a key is pushed inwardly, it will oscillate the rock shaft associated therewith; this will lift out of action the entire group of slides associated therewith. On the other hand, when the other key is pushed inwardly, it will lift out of action the other slides associated therewith, and as these keys are connected when one group is lifted the other is dropped. The sliding connection between the lever 155 and the posts having pin connections with the slots in the slides permits the slides to be raised out of action independently even when they are lowered by these controlling keys. Therefore, it will be apparent that the operator may quickly shift by pushing one of the keys so that the machine will either deliver silver dollars or carrying cases for dollar bills.

Associated with each bank of keys is a locking plate which has the double function of holding the keys in when they are depressed until all the actuations for a given transaction are performed by the machine, and the other of locking the keys so that they cannot be depressed or moved inwardly until a coin of a certain denomination enters the machine. These locking plates are similar in connection with each bank of keys, and a description of one will answer for the rest.

At the front of the machine there is a housing 159 (Figures 16 and 22). Mounted to slide vertically in the housing is a plate 160. This plate is formed with slots 161, there being a slot for each key rod. On each key rod is a pin 162 which extends into this slot. The lower edge of the slot, indicated at 163 in Fig. 10, inclines upwardly toward its lower end to a greater extent than the key rod so that the path of movement of the pin 162 is such that the plate must move downwardly or the key rod cannot be pushed inwardly. At the inner and lower end of the slot there is a notch 164. The plate is yieldingly forced upwardly by a spring 165. If the plate is free to move, then when a key is depressed or moved inwardly, the pin will ride along the inclined edge 163 of the slot, forcing the plate downwardly against the tension of the spring, and when the inner end of the slot is reached, the plate will be moved upwardly by the action of the spring, causing the notch to engage the pin on the key and hold the key from being retracted when it is released.

As above noted, there is locking plate for each bank of keys. Each plate has a rearwardly projecting arm 166 having a cam-shaped end 167. Mounted on a shaft 168 is an arm 169 which is adapted to engage this cam-shaped end of the arm 166 when the shaft 168 is oscillated. Again, it is noted that there is an arm 169 for each plate. The shaft 168 is actuated through suitable connections with the actuating lever 9 at the side of the machine, and this occurs on the rearward movement of the lever, after the transaction has been completed. This oscillation of the shaft 168 will depress the plates sufficiently to allow the pins to be disengaged from the notches, and the spring on the key rod will return the key to normal position. The plates associated with the key rods, if locked in raised position, will prevent a key rod from being depressed or pushed inwardly.

Associated with each plate is a locking lever 170 (Fig. 16). This locking lever is turned by a suitable spring so that the lower end thereof projects into an opening 171 in the plate and normally locks the plate against endwise movement. These levers 170 are controlled by mechanism which will now be described so that certain of the levers will be swung to unlock the plates as the coins enter the machine.

Associated with each magazine and at one side thereof is a depending arm 172. Attention is called particularly to Figs. 9 to 12, inclusive. These arms extend to a point near the bottom of the chute through which the coin passes. It will readily be seen from Fig. 12 that if one coin is moved along the chute to the magazine, it will swing the lever to a certain extent before the coin is free to pass underneath the arm. If two coins are placed in front of the slides and are moved inwardly to the magazine, they will swing the lever to a greater extent before there is sufficient room to pass underneath the end of the arm. Likewise three and four coins will swing this arm to different degrees. The arms 172 are all freely carried by a sleeve shaft 173 which in turn is mounted to turn freely upon a solid shaft 174. Associated with each arm is a toothed collar 175 which is secured by a set-screw 176 to the sleeve and, therefore, any movement of the toothed collar will impart a movement to the sleeve shaft. Each arm 172 is provided with a pawl 177 which is adapted to engage the teeth of the toothed collar. This pawl swinging with the arm 172 will move the toothed collar and likewise the sleeve shaft a distance depending upon the length of swing of the arm 172. If one coin passes underneath this arm, it will be given a certain degree of movement, and if two coins pass underneath the arm, it will be given a greater degree of movement.

Associated with each magazine and each bank of keys is an arm 178 which is fixed to this sleeve 173 so that any movement imparted to the sleeve will swing said arm. These arms are connected by means of links 179 to rock levers 180. Extending from side to side of the machine is a releasing bar 181. This releasing bar has a series of slots 182, and a pin 183 on each rock lever engages one of these slots 182. The slots 182 are of different lengths. Rigidly connected with each rock lever 180 is an arm 184 which extends outwardly so as to engage the side of a locking lever 170, and when this arm 184 engages the locking lever it will oscillate the same so as to withdraw it from the opening in the plate and thus release the plates associated with the particular locking lever. The slots are for the purpose of causing the unlocking of all the plates controlling keys equal in value to the coin or coins received. In other words, if a fifty cent piece be put in the machine, it will swing the arm associated with the half dollar magazine, and this will actuate the rock lever associated therewith and cause the releasing directly of the bank of keys indicating sales up to and including fifty cents. It will, at the same time, have moved the releasing bar 181 a sufficient distance so that the ends of the slots will engage the pins on the actuating levers of all magazines of lower denomination, swing the actuating levers, and through the arms carried thereby release the banks of keys of all lower figures, that is, release the bank of keys for delivering in change lower than fifty cents. This includes the unlocking of the penny controlling keys. It will readily be noted that if three coins, for example, three quarters, are placed in the machine, the extent of movement imparted to the arms will be substantially three times that which would be imparted by one coin, and means is provided so that the extent of movement of the sleeve caused by the three coins will unlock the bank of keys equal in value to the three coins, that is, all purchase keys up to and including seventy-five cents.

If two coins of different denominations are received into the machine, such for example as a half dollar and a quarter, the arms 172 for these two magazines are so set on the shaft 173 that the half dollar will operate first to swing the sleeve and then the quarter will operate to swing the sleeve. When the half dollar, therefore, operates upon this arm, it will move the sleeve shaft a distance depending upon the thickness of the coin. During this time, however, the arm associated with the quarter remains stationary and, as a result, the pawl thereof will move back one tooth, as shown in Fig. 12. Then, when the quarter operates upon this arm, it will take up the sleeve at this position to which the half dollar has moved it and move it an additional distance, depending upon the thickness of the quarter. So it is that a movement in the sleeve shaft is obtained equal in thickness to the two coins, and this added movement of the two coins in the sleeve shaft will unlock banks of keys equal in value to the sum of the two coins.

The shaft 174 supporting the sleeve shaft 173 is oscillated in a clockwise direction, as viewed in Fig. 12, when the transactions of the machine have been finished through the aid of the actuating lever 9 at the side of the machine. This shaft carries an arm 185 which comes into contact with the curved end 186 of the operating pawl 177. There is, of course, an arm 185 for each pawl, and these arms lift the pawls out of engagement with the teeth in the collar and permit the sleeve to be rotated through the action of the spring 187 to bring the same back to normal position. It is understood that the arms 172 after the coins pass the same drop back to normal vertical position.

This operation of the shaft 174 is brought about through an arm 188. Said arm is adapted to be engaged by a lug 189 carried by the actuating lever 9. A spring 190 moves the shaft 174 in the opposite direction when released from the lug 189 to normal position, and thus moves the arms 185 away from engagement with the operating pawls. The actuating lever 9 is pivoted at 191. On the side frame of the machine is a rack bar 192 (Fig. 3). Pivoted pawl 193 carried by the actuating lever engages the teeth of this rack bar. The pawl 193 rests against the end of this rack bar. This pawl is for the purpose of insuring that, when the actuating lever is started rearwardly by the operator, the movement of the actuating lever must be entirely completed before it can be again moved in the opposite direction. The pawl engaging the rack prevents this backward movement, and if the pawl has dropped off the end of the rack then it will reverse and permit the actuating lever to be moved backwardly, again serving to prevent any forward movement of it until the backward movement has been completed.

The main purpose of this actuating lever is to move the actuating member which causes the coins to be ejected. The actuating member $54^a$ for the ejecting of the coins is pivotally connected at each end to a swinging bar 194, (Figures 3 and 6), each bar being fixed to a shaft 195 so that the movement of one swinging bar will be imparted to the other. The swinging bar at the right of the machine, as viewed by the operator, is provided with a screw 196, which engages an L-shaped slot 197 in an arm 198 which is pivoted at 199 to the actuating lever 9. This arm 198 has a cam-shaped end adapted to engage a fixed lug 200, when the actuating lever is adjacent its extreme left hand position. The purpose of this lug is to raise the arm 198 to bring the horizontal section of the L-shaped slot into register with the screw 196, and thus permit a slight free movement of the actuating lever 9 without swinging the frame. As soon as the actuating lever 9 is moved toward the rear of the machine a slight distance, the screw will engage the vertical section of the L-shaped slot 197, and this will couple the swinging bar to the actuating lever so that the swinging bar will be moved to the right with the actuating lever as viewed in Fig. 3. This movement to the right carries all the slides that are down likewise to the right, and in turn carries all of the ejectors underneath the magazine so that the recesses formed therein will be loaded with coins. When the actuating lever 9 is moved in the opposite direction, that is, to the left as viewed in Fig. 3, it returns the slides to their normal position, pulls the ejectors forward over the discharge chutes, so that the coins drop through into the discharge chutes. The same action applies in connection with the carrying cases for the bills.

As the actuating lever 9 reaches the rear end of its stroke, it engages the arm 65 (Figures 1, 3 and 8) which swings all of the arms 56 and thus all of the swinging tubes will be moved so as to release the setting posts. It is to be remembered, however, that the setting posts are at this time locked down if they are lowered. This movement of the actuating lever to the rear of the machine also releases the tension bar for holding the indicators in raised position, which indicators are raised by the sales keys. The locking dog 31 which holds the tension frame 24 away from contact with the levers controlling the indicators has a depending arm 201. At the lower end of this depending arm 201 there is a slide bar 202. A spring 203 normally forces this bar to the left and throws the dog into locking engagement with the tension frame. This slide bar is in the path of movement of the actuating lever 9 and, therefore, when the actuating lever reaches the rear end of its stroke it will move the slide bar 202 to the right, as viewed in Fig. 3, thus swinging the locking dog so as to release the tension frame. The return movement of the actuating lever 9 not only ejects the coins but it releases the setting rods and also the sales keys. This is accomplished through the oscillation of the shaft 168. Said shaft 168 is formed with a depending arm 204 indicated in dotted lines in Fig. 3 and in full lines in Fig. 25. On the actuating lever is the adjustable plate 205 with one edge thereof extending over so as to make engagement with the arm 204. In Fig. 3 of the drawings, said plate is shown as engaging the arm 204, and any movement to the left will cause an oscillation of the shaft 168 so as to swing the arm 169 (Figs. 4 and 18) in a clockwise direction, thus depressing the locking plate for the sales keys, releasing the same and, at the same time, withdrawing the locking pin 50 from the notch 51 in the setting bar, and releasing the setting bars. Said pin 50 has a connection with a slotted arm 168ᵃ on the shaft 168. The actuating lever 9 is swung to the left of the normal position in Fig. 3 when it is retracted, and this movement is sufficient to release the keys and the setting posts, as above described. After the operator releases the actuating lever 9, the spring 206 moves it to the normal position shown in this Fig. 3.

The five dollar purchase key performs the sole function of releasing the setting posts for the reason that the capacity of the present machine is five dollars and, if a sale amounts to five dollars, then when the sale key is depressed all that is desired is to indicate the amount of sale and release the machine from the setting which was accomplished by the carrier case containing the five dollar bill as it went into the machine. As this case goes into the machine, it sets for delivery four dollars and one dollar in change, and it is this setting that is released by the key. The five dollar key rod is indicated at 66' in Fig. 19 of the drawings. This key rod engages a sliding bar at the rear end thereof, which raises an indicator indicating a sale of five dollars. This key rod 66' carries a pin 207 which is adapted to engage the lower end of a rock lever 208. This rock lever at its upper end engages an arm 209 on the shaft 168, and this shaft 168 controls the locking means 50 for the setting post. When the key rod 66', therefore, moves inwardly, it oscillates the shaft 168 so as to withdraw the locking pins 50 and release all of the setting rods, and thus the machine is set for another operation.

This oscillation of the shaft 168 also lowers the locking plate associated with the five dollar setting key so that it is not locked at its forward position, and the spring returns the same, the indicator remaining up. The machine is, therefore, reset for another operation.

If the sale at any time is an even sale, as, for example, if fifty cents is received into the machine and the sale is fifty cents, the half dollar going into the machine sets for delivery fifty cents in change. The pushing in of the fifty cent key withdraws all the slides which were set for delivering change, and there is no purpose in operating the actuating member for the slides. This can readily be avoided by a slight forward pull on the actuating lever 9 which at once releases all the setting posts, and likewise releases the sales key, resetting the machine to position for another sales action.

The machine, as above noted, is provided with a device for registering the amount which would be credited to war tax. This mechanism consists of a register 210 (Fig. 16) which is mounted for rotation, and also for bodily movement in a pair of swinging arms 211. Said arms are each provided with a slot 212. The casing of the register is formed with small hubs which slide in these slots which keep the casing from rotation. The shaft of the register extends through the slot at one side and is provided with a pinion 213 which, when rotated in one direction makes a proper entry in the registering instrument. Mounted on the actuating lever 9 is a segmental rack 214. The arms 211 are pivoted at 215. Rigidly connected to the register casing is a projecting plate 216. This is connected by means of a link 217 to a war tax key rod 218. When the war tax key rod is pushed inwardly it operates a slide 219 connected with an indicator which shows that a war tax is registered. It also swings the arms 211 and brings the pinion 213 into range of the segmental gear 214, so that, when the actuating lever 9 is oscillated, it will turn the pinion and thus register in the instrument.

Also connected to the casing of the register is a setting rod 220. Said rod is connected to the registering casing by a link 221. The rod at its outer end is formed with a V-shaped projection 222 which is adapted to engage the notched upper face of a bracket 223 and is yieldingly held in engagement therewith. There are ten notches, and the setting rod may be moved inwardly or outwardly, carrying the V-shaped projection into any one of these notches. As it moves inwardly, it will shift the recording instrument bodily rearwardly, and as a result the segmental gear on the actuating lever will engage the pinion of the recording instrument at a later period and thus impart a shorter movement thereto. When the setting rod is at the extreme outer position, then the greatest movement is given to the register, and this is so adjusted as to register ten cents which is to be credited to war tax. At each notch, as the setting rod is moved inwardly, the amount indicated thereby will be similarly registered. By this means a record may be made of an amount chargeable to war tax from one cent to ten cents. This registering instrument may be read at any time, and the amount payable in war tax thus determined.

Each coin chute is provided with an opening 224 (Figs. 4 and 7) in the under side thereof, and this opening is of such a size as to prevent any coin of less size than is intended to be received by the chute to drop through, and suitable means is provided for directing the coin dropping through the opening to a discharge slot 224ª (Fig. 1) at the front of the machine where it is readily accessible. If through mistake, therefore, the coin is dropped through the wrong chute or slot, it will be readily recovered so that it can be put in the right chute.

It is not thought necessary to go to any length into the description of the operation of the machine. It may be noted, however, that in the case of a sale the coin or coins received are dropped into the receiving slots provided therefor. Then the actuating lever 5 at the top of the machine is moved rearwardly, and upon the rearward movement of this lever the indicator set for the previous sale is released so that it drops and the coin is pushed forward into the magazine adapted to receive the same. The coin on its rearward movement through the operation of the actuating lever 5 sets certain swinging tubes so that they will engage with their respective setting posts. The coin also in its rearward movement unlocks the banks of keys representing sales equal in value to the coin or the sums of the coins which are received. The rearward movement of the actuating lever 5 depresses the setting posts which have been connected up to the actuating cross bar by the coin, and these setting bars as they move downwardly trip slides controlling coins equal in value to the value of the coin put into the machine. The purchase or sales key is then depressed or moved inwardly and this withdraws from the combination set slides equal in value to the sales price, leaving in their lower position for actuation slides controlling coins equal in amount to the change to be given. The actuating lever at the side of the machine is then operated and as it is moved rearwardly it carries the slides rearwardly, and through these slides carries the ejectors rearwardly which are to deliver coins in change until they are brought underneath the chute where they are loaded with coins to be delivered.

The actuating lever at the side of the machine also releases the tension frame at the rear of the machine so that the indicators will be held up after the sales key is released and thus remain in raised position until the next sales operation. This rearward movement of the actuating lever also operates to release the unlocking means for the purchase keys so as to permit it to return to normal position for another actuation in the next sales operation. This actuating lever on its rearward movement likewise releases all the swinging tubes so that they may be returned to normal position, the setting rods being held down by the locking pins. The movement of the actuating lever in the opposite direction causes an ejection of the coins in change. It also releases the setting posts so that they may be returned to normal position and the slides raised from action to their normal position, and likewise releases the keys so that they may be returned to normal position.

At the close of a day, if it is desired to empty the machine, all that is necessary is to unlock the drawer 10, withdraw the slide 21, remove the top of the machine so that access may be had to the swinging tubes, and set all of the swinging tubes so that the slides operated thereby may be moved into engagement with the actuating member, and then, through the actuating lever at the side of the machine, move the slides rearwardly, bringing all of the ejectors into line with the magazines and the coins will all drop through into the drawer.

Adjacent each magazine 17 is an overflow chute 17ª (Fig. 4) which leads to an opening 17ᵇ, and this opening is directly above the drawer 10. When the magazines are full of coins and the slide forces another coin from the magazine, it will push the topmost coin above the top of the magazine over onto the chute 17ª and the coin will slide down the chute 17ª through the opening 17ᵇ into the drawer 10.

It sometimes happens that an operator after having inserted the coins into the machine and set for delivery the proper amount of change, will push the wrong purchase key. If the actuating lever at the side of the machine be operated, it will release the purchase key but it will also release the setting post. Means is, therefore, provided whereby the purchase keys may be released without releasing the setting means. This means comprises an error key 225 (Figs. 1 and 18) which slides in suitable ways and bears at its inner end against an arm 226 projecting from a shaft 227. Each slide is provided with a pin 229, and associated with each pin on the shaft 227 is a projecting arm 230. It will readily be seen that, if the error key is forced inwardly, it will rotate the shaft and the arm 230 will strike the pin 229, and thus release all the slots and unlock any key which has been depressed. A spring 228 serves to return the error key to normal position, and also rotate the shaft so as to release the pins 229.

Associated with each magazine is a brush 231 (Figs. 4 and 18). The magazine is cut away at the lower part thereof, and this brush, which is preferably of rubber is secured to the lower end of the magazine by a clamping plate 232. The thickness of the ejectors is less than the thickness of a coin. It sometimes happens, however, that the second coin from the bottom in the magazine clings to the coin in the ejector, and the purpose of the yielding rubber brush is to brush back the coins and insure the delivery of a single coin with each ejector. It is to be noted that this brush at its inner face is substantially flush with the inner wall of the magazine.

It will be noted that a single coin sets up for delivery a combination of coins equal in value to the coin received, and the purchase key, when depressed, withdraws from the combination set up an amount equal to the purchase price, permitting the remainder to be delivered, which is accomplished by the actuating slide when it is moved through the actuating lever at the side of the machine. The purchase keys have nothing to do with the delivering of the coins. The coin itself sets the slides which are to be actuated in the delivering of the change. If, therefore, the actuating lever is operated without depressing a key, the full amount of change would be delivered. It will also be noted that, when coins of different denominations are given in payment of a sale, the machine always sets for delivery change from the coin of lowest denomination and the purchase key withdraws from the change set an amount equal to the excess of the purchase price over the value of the coins of larger denomination. This is necessary in order that the same purchase price may be deducted from different combinations of coins by the same purchase key. For example, if a dollar is received in payment for a sale of seventy cents, the dollar entering the machine sets for delivery fifty cents, a quarter, a dime and three nickles, and the seventy cent key withdraws all the slides controlling these coins, except the quarter slide and the nickel slide. Therefore, the seventy cent purchase key has no means for engaging the controlling plate associated with the quarter delivering slide. If a half dollar and a quarter be received in payment, the half dollar ordinarily would set up for delivery a quarter, a dime and three nickels. If this change remains set and the seventy-cent purchase key be depressed, there is no means controlled thereby for lifting out the quarter slide and wrong change would be given. What happens, however, is that the quarter as it passes through to its magazine, kicks off the setting of the half dollar so that, when the two coins, the half dollar and the quarter enter the machine, the full change set for delivery is a dime and three nickels, and the seventy cent purchase key is provided with means for lifting out of the slides controlling the dimes and nickels, thus leaving for delivery one nickel only, which is the correct change.

From the above, it will be apparent that by this arrangement of devices, wherein the change from a plurality of coins is taken from the coin of lowest denomination, a single purchase key for a given value may be moved and the proper change obtained from different combinations of coins or a single coin.

The other features incident to the operation of the machine have been described more or less in detail with the description of the device, and it is not thought necessary to dwell to any further length on the operation of the machine. It is obvious that minor changes in the details of construction and the arrangement of the parts may be made without departing from the spirit of the invention as set forth in the appended claims.

Having thus described the invention, what I claim as new and desire to secure by Letters Patent, is:—

1. In a change making machine, means controlled by a single coin received for setting for delivery change equal in value to the coin prior to the operation of the purchase keys, purchase keys, means actuated thereby for withdrawing from the change set for delivery an amount equal to the purchase key depressed, and means for delivering the remaining change set.

2. In a change making machine, means controlled by a single coin received for setting for delivery change equal in value to the coin prior to the operation of the purchase keys, purchase keys, means actuated thereby for withdrawing from the change set for delivery an amount equal to the purchase key depressed, means for delivering the remaining change set, means for normally locking the purchase keys, and means controlled by the entering coin for unlocking only the purchase keys equal to and less than the coin in value.

3. In a change making machine, means for setting change for delivery, means controlled by a single coin entering the machine for causing change to be set equal in value to the coin prior to the operation of the purchase keys, a plurality of purchase keys, means actuated thereby for withdrawing from the change set for delivery, an amount equal to the purchase key depressed, and means for delivering the remaining change set.

4. In a change making machine, means for setting change for delivery, means controlled by a single coin entering the machine for causing change to be set equal in value to the coin prior to the operation of the purchase keys, a plurality of purchase keys, means actuated thereby for withdrawing from the change set for delivery, an amount equal to the purchase key depressed, means for delivering the remaining change set, means for normally locking the purchase keys, and means controlled by the entering coin for unlocking only the purchase keys equal to and less in value than the entering coin.

5. In a change making machine, a plurality of magazines, an ejector for each magazine, a device connected with each ejector, a delivering member common to all of said devices, said devices being normally held above the path of movement of said delivering member, and means controlled by the entering coins for dropping devices for controlling change equal in value to the coin received into the path of movement of said delivering member prior to the operation of the purchase keys, a plurality of purchase keys, and means operated by the purchase key for withdrawing from the devices lowered by the entering coin, devices controlling coins equal in value to the purchase key depressed.

6. In a change making machine, a plurality of magazines, an ejector for each magazine, a device connected with each ejector, a delivering member common to all of said devices, said devices being normally held above the path of movement of said delivering member, means controlled by the entering coins for dropping devices for controlling change equal in value to the coin received into the path of movement of said delivering member prior to the operation of the purchase keys, a plurality of purchase keys, and means operated by the purchase key for withdrawing from the devices lowered by the entering coin, devices controlling coins equal in value to the purchase key depressed, means for locking said purchase keys, and means operated by the entering coin for unlocking purchase keys equal to and less in value than the value of the entering coin.

7. In a change making machine, a plurality of magazines, an ejector for each magazine, a slide connected to each ejector, a delivering member common to the slides, said slides being normally held out of the path of movement of the delivering member, an actuating member for depressing the slides into the path of movement of the delivering member, devices controlled by the entering coin for determining the slides which are to be depressed prior to the operation of the purchase keys, a plurality of purchase keys, and devices operated thereby for lifting slides dropped by the coin for controlling the delivery of coins equal in value to the purchase key depressed.

8. In a change making machine, a plurality of magazines, an ejector for each magazine, a slide connected to each ejector, a delivering member common to the slides, said slides being normally held out of the path of movement of the delivering member, an actuating member for depressing the slides into the path of movement of the delivering member, and devices controlled by the entering coin for determining the slides which are to be depressed, a plurality of purchase keys, normally locked against movement, means controlled by the coins entering the machine for unlocking the purchase keys equal to or less in value than the coin entering the machine, and devices controlled by said unlocked keys for raising slides controlling coins equal in value to the purchase key depressed.

9. In a change making machine, a plurality of magazines, an ejector for each magazine, a slide connected to each ejector, a delivering member locked below the normal position of the slides, means for holding the slides from movement when raised, an actuating member for lowering the slides into the path of movement of the delivering member, devices controlled by an entering coin for causing said actuating member to lower slides controlling coins equal in value to the entering coin, a plurality of purchase keys normally locked against movement, means actuated by the entering coin for unlocking purchase keys equal to or less in value than the entering coin, and means operated by the purchase key for raising slides free of the delivery member, which slides are equal in value to the purchase key depressed.

10. In a change making machine, the combination of a coin magazine, an ejector therefor, a slide connected to said ejector, a setting post connected to said slide whereby the same may be raised and lowered, said connection permitting free endwise movement of the slide, means for locking the slide against movement when raised, an actuating member for moving the slide to eject a coin when said slide is lowered, an actuating member for depressing said setting post, and means controlled by the entering coins for connecting the actuating member to the setting post.

11. In a change making machine, the combination of a coin magazine, an ejector therefor, a slide connected to said ejector, a setting post connected to said slide whereby the same may be raised and lowered, said connection permitting free endwise movement of the slide, means for locking the slide against movement when raised, an actuating member for moving the slide to eject a coin when said slide is lowered, an actuating member for depressing said setting post, means controlled by the entering coins for connecting the actuating member to the setting post, said setting post being made in sections slidable relative to each other, means for locking the upper section when the post is depressed, and means controlled by a purchase key for raising the lower section to lift the slide from engagement with the actuating member.

12. In a change making machine, a coin magazine, an ejector therefor, a slide connected to said ejector, a setting post connected to said slide for raising and lowering the same, means for locking the slide when raised against endwise movement, means for moving the slide endwise when lowered for ejecting a coin, an actuating member for depressing said setting post, means controlled by the coin for connecting said actuating member to said setting post, said setting post being formed in sections having a pin and slot connection with each other, means for normally locking the upper section when lowered, a rocker bar, means connected with the rocker bar for raising said slide from the path of movement of the actuating means therefor, a series of controlling plates connected to the rocker bar for oscillating the same, and a series of purchase keys having means for swinging the controlling plates when the keys are depressed.

13. In a change making machine, a coin magazine, an ejector therefor, a slide connected to said ejector, a setting post connected to said slide for raising and lowering the same, means for locking the slide when raised against endwise movement, means for moving the slide endwise when lowered for ejecting a coin, an actuating member for depressing said setting post, means controlled by the coin for connecting said actuating member to said setting post, said setting post being formed in sections having a pin and slot connection with each other, means for normally locking the upper section when lowered, a rocker bar, means connected with the rocker bar for raising said slide from the path of movement of the actuating means therefor, a series of controlling plates connected to the rocker bar for oscillating the same, a series of purchase keys having means for swinging the controlling plates when the keys are depressed, means for normally locking the keys against movement, and means controlled by the entering coin for releasing keys equal and less in value than the entering coin.

14. In a change making machine, a plurality of magazines for coins of different denominations, an ejector for each magazine, a slide connected with each ejector, a setting post associated with each slide, means for normally holding the slides raised and locked against endwise movement, means common to all of the slides for moving the same endwise when lowered for ejecting the coins, an actuating member common to all of the setting posts for depressing the same devices controlled by the entering coins for connecting said actuating member to certain of said setting posts, purchase keys, and means actuated thereby for lowering slides corresponding to the difference between the purchase price and the coin received.

15. In a change making machine, a plurality of magazines for coins of different denominations, an ejector for each magazine a slide connected with each ejector, a setting post associated with each slide, means for normally holding the slides raised and locked against endwise movement, means common to all of the slides for moving the same endwise when lowered for ejecting the coins, an actuating member common to all of the setting posts for depressing the same, devices controlled by the entering coins for connecting said actuating member to certain of said setting posts, a rocker bar for each slide, means for connecting the rocker bar to the slide whereby it may be raised from the path of movement of the actuating member, a plurality of banks of purchase keys, a group of controlling plates for each bank of purchase keys, said controlling plates being connected to the respective rocker bars for oscillating the same, and means carried by the various purchase keys in each bank for oscillating certain of said controlling plates.

16. In a change making machine, a plurality of magazines for coins of different denominations, an ejector for each magazine, a slide connected with each ejector, a setting post associated with each slide, means for normally holding the slides raised and locked against endwise movement, means common to all of the slides for moving the same endwise when lowered for ejecting the coins, an actuating member common to all of the setting posts for depressing the same, devices controlled by the entering coins for connecting said actuating member to certain of said setting posts, a rocker bar for each slide, means for connecting the rocker bar to the slide whereby it may be raised from the path of movement of the actuating member, a plurality of banks of purchase keys, a group of controlling plates for each bank of purchase keys, said controlling plates being connected to the respective rocker bars for oscillating the same, and means carried by the various purchase keys in each bank for oscillating certain of said controlling plates, and devices actuated by certain of said keys and controlled by the entering coins whereby the same purchase key may be caused to actuate different controlling plates, depending upon the entering coin.

17. In a change making machine, a plurality of magazines for coins of different denominations, an ejector for each magazine, a slide connected with each ejector, a setting post associated with each slide, means for normally holding the slides raised and locked against endwise movement, means common to all of the slides for moving the same endwise when lowered for ejecting the coins, an actuating member common to all of the setting posts for depressing the same, devices controlled by the entering coins for connecting said actuating member to certain of said setting posts, a rocker bar for each slide, means for connecting the rocker bar to the slide whereby it may be raised from the path of movement of the actuating member, a plurality of banks of purchase keys, a group of controlling plates for each bank of purchase keys, said controlling plates being connected to the respective rocker bars for oscillating the same, means carried by the various purchase keys in each bank for oscillating certain of said controlling plates, devices actuated by certain of said keys and controlled by the entering coins whereby the same purchase key may be caused to actuate different controlling plates, depending upon the entering coin, each setting post being made in sections having a limited sliding connection with each other, a spring for raising both sections, a spring of lighter tension for normally depressing the lower section, and means for locking the upper section when depressed.

18. In a change making machine, a plurality of magazines for coins of different denominations, an ejector for each magazine, a slide connected to each ejector, a delivering member common to the slides for moving the same endwise, said slides being normally disconnected therefrom, a setting post for lowering each slide into the path of movement of the delivering member, an actuating member common to all the setting posts for depressing the same, said actuating member being normally disconnected from the setting post, and means operated by the coin entering the machine for connecting said actuating member to the setting posts controlling ejectors for coins in change equal in value to the coin entering the machine.

19. In a change making machine, a plurality of magazines for coins of different denominations, an ejector for each magazine, a slide connected to each ejector, a delivering member common to the slides for moving the same endwise, said slides being normally disconnected therefrom, a setting post for lowering each slide into the path of movement of the delivering member, an actuating member common to all the setting posts for depressing the same, said actuating member being normally disconnected from the setting post, means operated by the coin entering the machine for connecting said actuating member to the setting posts controlling ejectors for coins in change equal in value to the coin entering the machine, and means controlled by the coins when coins of more than one denomination are received into the machine for causing the disconnection of the actuating member from the setting posts controlling all the coins equal to and greater in value than the coin of lowest denomination whereby the setting post will be lowered, controlling the coins in change equal in value to the entering coin of lowest denomination only.

20. In a change making machine, a plurality of magazines for coins of different denominations, an ejector for each magazine, a slide connected to each ejector, a delivering member common to the slides for moving the same endwise, said slides being normally disconnected therefrom, a setting post for lowering each slide into the path of movement of the delivering member, an actuating member common to all the setting posts for depressing the same, said actuating member being normally disconnected from the setting post, and means operated by the coin entering the machine for connecting said actuating member to the setting posts controlling ejectors for coins in change equal in value to the coin entering the machine, means controlled by the coins when coins of more than one denomination are received into the machine for causing the disconnection of the actuating member from the setting posts controlling all the coins equal to and greater in value than the coin of lowest denomination whereby the setting posts will be lowered, controlling the coins in change equal in value to the entering coins of lowest denomination only, a plurality of purchase keys, and devices operated thereby for raising the slides, said purchase keys when a plurality of coins are received into the machine, operating to raise slides controlling coins equal in value only to the difference between the purchase key and the value of all coins greater than the coin of lowest denomination received.

21. In a change making machine, a plurality of magazines for coins of different denominations, an ejector for each magazine, devices connected to each ejector, an actuating member common to said devices, said devices being normally out of engagement with the actuating member, a setting post associated with each device, an actuating member for depressing said setting posts, said actuating member being normally disconnected from the setting posts, devices controlled by said last named actuating member for positively moving the coins into the magazines, means operated upon by the coins on their way to the magazines for connecting certain of said setting posts with the actuating member therefor whereby the devices moved into engagement with the actuating member are controlled by the coins, and means controlled by the entering coins for insuring the disconnection of all of the setting posts from the actuating member therefor, controlling coins equal to and greater in value than the coin of lowest denomination received.

22. In a change making machine, a plurality of magazines for coins of different denominations, an ejector for each magazine, devices connected to each ejector, an actuating member common to said devices, said devices being normally out of engagement with the actuating member, a setting post associated with each device, an actuating member for depressing said setting posts, said actuating member being normally disconnected from the setting posts, devices controlled by said last named actuating member for positively moving the coins into the magazines, means operated upon by the coins on their way to the magazines for connecting certain of said setting posts with the actuating member therefor whereby the devices moved into engagement with the actuating member are controlled by the coins, means controlled by the entering coins for insuring the disconnection of all of the setting posts from the actuating member therefor controlling coins equal to and greater in value than the coin of lowest denomination received, a plurality of purchase keys, means actuated by the purchase keys when depressed for raising certain of said devices from engagement with the delivering member therefor, means for locking the purchase keys against movement, and means controlled by the entering coins for unlocking purchase keys equal in value to and less in value than the sum of the value of the coins received into the machine.

23. In a change making machine, the combination with a plurality of magazines adapted to receive coins of different denominations, an ejector for each magazine, a delivering member common to all of the ejectors, a setting post associated with each ejector for controlling the connection thereof with the delivering member, a swinging tube telescoping the upper end of each setting post, an actuating member for depressing said setting posts, connected to the swinging tubes, each setting post having a shoulder adapted to be engaged by its setting tube, devices controlled by the entering coins for moving certain of said setting tubes over the shoulder on the setting posts, and devices also operated by said entering coins for insuring the disengagement of certain of said swinging tubes with the shoulder of the setting posts with which they are associated.

24. In a change making machine, a plurality of magazines for coins of different denominations, an ejector for each magazine, a delivering member associated with each ejector, for actuating the same, means for controlling the connection of the ejectors with the delivering member, including a rocking bar for each ejector, a plurality of banks of keys, a group of controlling plates for each bank of keys, one for each rocking bar, said keys having pins moved thereby adapted to make connection with certain selected controlling plates in the group, other keys in the same bank having pins making connection with other controlling plates in the same group.

25. In a change making machine, a plurality of magazines for coins of different denominations, an ejector for each magazine, a delivering member associated with each ejector, for actuating the same, means for controlling the connection of the ejectors with the delivering member, including a rocking bar for each ejector, a plurality of banks of keys, a group of controlling plates for each bank of keys, one for each rocking bar, said keys having pins moved thereby adapted to make connection with certain selected controlling plates in the group, other keys in the same bank having pins making connection with other controlling plates in the same group, certain of said keys having a tumbler carried thereby provided with pins adapted to engage certain of said plates when the tumbler is in one position and other of said plates when the tumbler is in another position, and means controlled by the entering coin for shifting the tumbler.

26. In a change making machine, a plurality of magazines for coins of different denominations, means controlled by an entering coin for setting for delivery coins in change equal in value to the coin received, and means for withdrawing from the coins set for delivery an amount equal to the purchase price, said last-named means including a group of controlling plates, a plurality of purchase keys associated with each group of controlling plates, certain of said keys having pins fixed thereto for engaging certain of said controlling plates, other keys having pins fixed thereto for engaging other controlling plates and certain of said keys having rotating tumblers carrying pins adapted to engage, when in one position certain of said controlling plates, and when in another position, other controlling plates, and means controlled by the entering coin for shifting the tumblers.

27. In a change making machine, a plurality of magazines for coins of different denominations, ejectors for each magazine, a manually actuated lever, and means controlled thereby for forcing the coins into their respective magazines, setting devices for setting change for delivery adapted to be depressed by said actuating lever, and means controlled by the coins for connecting certain of said setting devices to the actuating lever, and a plurality of purchase keys and devices actuated thereby for withdrawing from the change set for delivery an amount equal to the purchase key depressed.

28. In a change making machine, a plurality of magazines for coins of different denominations, a plurality of purchase keys operating in conjunction with the coins for determining the change to be delivered, said purchase keys being normally locked against movement, and means controlled by a plurality of coins of the same denomination for unlocking keys equal to and less in value than the sum of the value of the coins received.

29. In a change making machine, a plurality of magazines for coins of different denominations, a plurality of purchase keys operating in conjunction with the coins for determining the change to be delivered, said purchase keys being normally locked against movement, a swinging arm associated with each magazine and adapted to be actuated by the coin as it passes into the magazine, and devices operated by the movement of said arm for releasing the locking keys, said devices being constructed so that the extent of movement of said arm determines the number of keys unlocked whereby a plurality of coins passing simultaneously through the same magazine, unlock purchase keys equal in value to and less than the coins received.

30. In a change making machine, a plurality of magazines for coins of different denominations, a plurality of purchase keys operating in conjunction with the coins for determining the change to be delivered, said purchase keys being normally locked against movement, a swinging arm associated with each magazine, a sleeve shaft, a collar carrying each arm mounted on said shaft, a ratchet wheel fixed to the shaft, a pawl carried by the collar and engaging the ratchet wheel, devices connected to said shaft for unlocking the keys, said devices including means whereby the extent of movement of the shaft determines the value of the keys unlocked, the arms associated with the different magazines being timed so as to operate in sequence whereby a coin of one denomination will swing the shaft to a certain extent and a coin of another denomination will swing the shaft to an added extent whereby the movement imparted to the shaft is determined by the sum of the thicknesses of the two coins, and purchase keys unlocked equal in value to the value of the coins entering the machine.

31. In a change making machine, a plurality of magazines for coins of different denominations, a plurality of purchase keys operating in conjunction with the coins for determining the change to be delivered, said purchase keys being normally locked against movement, a swinging arm associated with each magazine, a sleeve shaft, a collar carrying each arm mounted on said shaft, a ratchet wheel fixed to the shaft, a pawl carried by the collar and engaging the ratchet wheel, devices connected to said shaft for unlocking the keys, said devices including means whereby the extent of movement of the shaft determines the value of the keys unlocked, the arm associated with the different magazines being timed so as to operate in sequence whereby a coin of one denomination will swing the shaft to a certain extent and a coin of another denomination will swing the shaft to an added extent whereby the movement imparted to the shaft is determined by the sum of the thicknesses of the two coins, and purchase keys unlocked equal in value to the value of the coins entering the machine, and means for releasing the pawls and restoring the parts to normal position after the sales operation.

32. In a change making machine, a casing, a plurality of magazines therein, receiving slots at the upper part of the casing for coins, and chutes for connecting and receiving slots to the magazines, a slide associated with each chute for positively forcing the coins over the magazines, an actuating lever adjacent the coin receiving slots for actuating said slides, setting posts controlled by the coins as they pass to the magazines for setting the change for delivery, said setting posts being depressed by said actuating lever, means controlled by the coins for connecting the setting post to the actuating lever, an actuating lever for delivering the change, devices controlled by the setting posts adapted to be connected to the actuating lever, a plurality of purchase keys, and devices controlled thereby for disconnecting certain of said devices from the actuating lever for delivering the coin and leaving set for delivery, change determined by the purchase key and the coin or coins received into the machine.

33. In a change making machine, a plurality of magazines, an ejector for each magazine, an actuating member for delivering the coins, devices connected with the ejectors and normally held from engagement by said actuating member, means whereby devices controlling coins equal in value to the single coin received are lowered into the path of movement of the actuating member, a purchase key and devices controlled thereby for raising from action devices controlling the coins equal in amount to the purchase key.

34. In a change making machine, a plurality of magazines, an ejector for each magazine, a slide connected to each ejector, a common actuating member for moving the slides endwise to eject the coins, said slides being normally raised from engagement with the actuating member, devices whereby when a plurality of coins are received, slides controlling coins equal in value to the coin of lowest denomination received may be lowered, a purchase key, and devices controlled thereby whereby slides controlling coins equal in value to the difference between the purchase price and the sum of the coins above the coin of lowest denomination may be raised from engagement by the actuating member.

35. In a change making machine, a plurality of magazines, an ejector for each magazine, devices controlled by the coins received for setting for actuation certain of said ejectors, a plurality of purchase keys, and devices operated by the purchase keys for withdrawing from action certain of said ejectors and leaving in action ejectors for ejecting coins equal in value of the change to be returned, said devices controlled by the coins and the purchase key automatically operating so as to insure the setting of a nickel ejector for delivering change, if the change to be delivered is a nickle or more.

36. In a change making machine, a plurality of magazines, an ejector for each magazine, devices controlled by the coins received by setting for actuation certain of said ejectors, a plurality of purchase keys, and devices operated by the purchase keys for withdrawing from action certain of said ejectors and leaving in action ejectors for ejecting coins equal in value of the change to be returned, said devices controlled by the coins and the purchase key automatically operating so as to insure the setting of a nickel ejector for delivering change, if the change to be delivered is a nickel or more, a penny magazine, a plurality of ejectors for said penny magazine, penny purchase keys for dropping ejectors for actuation for delivering pennies equal in value to the difference between the penny purchase key depressed and a nickel, and means operated by said penny purchase key for automatically lifting the nickel ejector operating device from action.

37. A change making machine including a nickel magazine having a plurality of superposed ejectors, each operating to eject a nickel, an actuating member, a slide connected to each ejector and normally held raised above the actuating member, a setting post for lowering each slide into the path of movement of the actuating member, a plurality of purchase keys, and automatic means controlled by the coins as they enter the machine for selecting the slides ejecting the nickels to be lifted from operative engagement by the actuating member so as to insure that the uppermost slides for ejecting nickels shall always be in action if any nickel ejector is to be operated.

38. In a change making machine, magazines adapted to receive respectively, nickels, dimes, quarters, and coins of higher denominations, an ejector associated with each magazine and three superposed ejectors associated with the nickel magazine, a slide connected to each ejector, a setting post for each ejector, devices controlled by a dime entering the machine for lowering the setting posts associated with the two topmost nickel ejecting slides, a ten cent purchase key, and means associated therewith for lifting from action said two topmost controlling slides for the nickel, devices operated by a quarter entering the machine for lowering the setting post for all three nickels, and means actuated by the lowering of the setting post for the lowermost nickel ejecting slide for causing the ten cent purchase key, when depressed, to lift from action the slides associated with the two lowermost ejectors.

39. In a change making machine, magazines adapted to receive respectively, nickels, dimes, quarters, and coins of higher denominations, an ejector associated with each magazine and three superposed ejectors associated with the nickel magazine, a slide connected to each ejector, a setting post for each ejector, devices controlled by a dime entering the machine for lowering the setting posts associated with the two topmost nickel ejecting slides, a ten cent purchase key, and means associated therewith for lifting from action said two topmost controlling slides for the nickel, devices operated by a quarter entering the machine for lowering the setting post for all three nickels, and means actuated by the lowering of the setting post for the lowermost nickel ejecting slide for causing the ten cent purchase key, when depressed, to lift from action the slides associated with the two lowermost nickel ejectors, a nickel purchase key, and means carried thereby and automatically controlled by the coins entering the machine for the insuring the raising from action the slide connected to the lowermost nickel ejector in action when said nickel purchase key is depressed.

40. In a change making machine, a plurality of coin receiving magazines including magazines for nickels and pennies respectively, three ejectors associated with the nickel magazine, five ejectors associated with the penny magazine, an actuating member, slides connected with each ejector and normally held raised from engagement by the actuating member, devices controlled by the coins for lowering the slides connected to the ejectors for the nickels, purchase keys for nickels and multiples of nickels and for pennies, said purchase keys for nickels and multiples thereof operating to lift certain of said slides connected with the nickel ejectors from action, devices operated by the purchase keys for pennies for lowering slides for delivering pennies equal in value to the difference between the purchase price in pennies and a nickel, and means automatically controlled by the penny keys for lifting the nickel slide from action when the penny key is depressed.

41. In a change making machine, a plurality of coin receiving magazines including magazines for nickels and pennies respectively, three ejectors associated with the nickel magazine, five ejectors associated with the penny magazine, an actuating member, slides connected with each ejector and normally held raised from engagement by the actuating member, devices controlled by the means for lowering the slides connected to the ejectors for the nickels, purchase keys for nickels and multiples of nickels and for pennies, said purchase keys for nickels and multiples thereof operating to lift certain of said slides connected with the nickel ejectors from action, devices operated by the purchase keys for pennies for lowering slides for delivering pennies equal in value to the difference between the purchase price in pennies and a nickel, means automatically controlled by the penny keys for lifting the nickel slide from action when the penny key is depressed, and automatic means for switching the connection so that the penny purchase key, when depressed, will lift from action the slide connected to the lowermost nickel ejector set for delivering nickels.

42. A change making machine including in combination a nickel magazine, three ejectors associated with said nickel magazine, a penny magazine, five ejectors associated with the penny magazine, a slide connected to each ejector, an actuating member for the slides, said slides being normally raised from engagement with the actuating member, purchase keys for nickels and multiples thereof, for raising the nickel slides from operative engagement by the actuating member, penny purchase keys, and devices actuated thereby for lowering the slides connected with the penny ejectors for ejecting pennies in value equal to the difference between the penny purchase key depressed and a nickel, a sleeve reciprocated by the penny purchase key, a fixed hook carried by the sleeve, said hook being adapted to lift the slide connected with the lowermost ejector for the nickels, if down, a hook pivoted to said sleeve and normally held raised, and means actuated by the raising of the slide connected to the lowermost ejector for lowering said pivoted hook whereby said hook operates when the penny purchase key is depressed to lift the slide connected to the middle ejector for the nickels.

43. A change making machine including in combination a nickle magazine, three ejectors associated with said nickel magazine, a penny magazine, five ejectors associated with the penny magazine, a slide connected to each ejector, an actuating member for the slides, said slides being normally raised from engagement with the actuating member, purchse keys for nickels and multiples thereof, for raising the nickel slides from operative engagement by the actuating member, penny purchase keys, devices actuated thereby for lowering the slides connected with the penny ejectors for ejecting pennies in value equal to the difference between the penny purchase key depressed and a nickel, a sleeve reciprocated by the penny purchase key, a fixed hook carried by the sleeve, said hook being adapted to lift the slide connected with the lowermost ejector for the nickels, if down, a hook pivoted to said sleeve and normally held raised, means actuated by the raising of the slide connected to the lowermost ejector for lowering said pivoted hook whereby said hook operates when the penny purchase key is depressed to lift the slide connected to the middle ejector for the nickels, a third hook pivoted to said sleeve and normally held raised, and means actuated by the raising of the slide connected to the middle ejector for the nickels for lowering the third hook to cause the same to lift the slide of the topmost ejector when the penny purchase key is depressed.

44. In a change making machine, a plurality of magazines, an ejector for each magazine, devices connected with each ejector, an actuating member for moving said devices to operate the ejectors, each device being normally out of engagement with the actuating member, means for moving said devices into the path of movement of the actuating member, purchase keys for raising said devices from engagement with the actuating member, an actuating lever for moving said actuating member, means for latching said keys when depressed, and means whereby said actuating lever may be operated to release the depressed key without moving said actuating member.

45. In a change making machine, a magazine, a setting post associated therewith, means controlled by the coin for depressing the post, means for locking the post in lowered position, an ejector for the magazine, a slide connected to the ejector, means connecting the setting post to the slide whereby it may be raised and lowered, said setting post being formed in sections permitting the slide to be raised when the post is locked down, an actuating member adapted to engage the slide when lowered, a purchase key, and devices operated thereby for raising the slide, means for latching the purchase key when depressed, an actuating lever for said actuating member, and means whereby said actuating lever operates to release the locking means for the post and the latching means for the depressed key.

46. In a change making machine, a plurality of magazines for coins of different denominations, an ejector for each magazine having an opening therethrough into which the coin is adapted to be dropped and moved by the ejector for delivery, a sliding plate beneath the magazines over which the ejector slides, a drawer beneath the sliding plate, whereby when said sliding plate is removed, the ejector may be moved into line with the magazines and all the coins in the magazines discharged into the drawer.

47. A change making machine including in combination penny purchase keys, devices controlled thereby for delivering penny change, a war tax register normally out of operative position, a war tax key for lowering the same into operative position, means for delivering the pennies and simultaneously actuating the register, and means for shifting the position of the register so as to register the proper amount of the purchase price chargeable to war tax.

In testimony whereof, I affix my signature.

WILLIAM W. ROBLYER.